(12) United States Patent
Mukherjee et al.

(10) Patent No.: US 11,205,917 B2
(45) Date of Patent: Dec. 21, 2021

(54) RECHARGEABLE ALUMINUM ION BATTERY

(71) Applicant: Everon24, Inc., Bedford, MA (US)

(72) Inventors: Rahul Mukherjee, Troy, NY (US); Nikhil A. Koratkar, Clifton Park, NY (US)

(73) Assignee: Everon24, Inc., Woburn, MA (US)

( * ) Notice: Subject to any disclaimer, the term of this patent is extended or adjusted under 35 U.S.C. 154(b) by 0 days.

(21) Appl. No.: 16/807,105

(22) Filed: Mar. 2, 2020

(65) Prior Publication Data

US 2020/0203988 A1 Jun. 25, 2020

Related U.S. Application Data

(63) Continuation of application No. 15/693,926, filed on Sep. 1, 2017, now Pat. No. 10,916,963, which is a
(Continued)

(51) Int. Cl.
*H01M 10/00* (2006.01)
*H02J 7/35* (2006.01)
*H01M 4/46* (2006.01)
*H01M 4/485* (2010.01)
*H01M 4/525* (2010.01)
(Continued)

(52) U.S. Cl.
CPC .............. *H02J 7/35* (2013.01); *H01M 4/38* (2013.01); *H01M 4/463* (2013.01); *H01M 4/485* (2013.01); *H01M 4/505* (2013.01); *H01M 4/525* (2013.01); *H01M 4/58* (2013.01); *H01M 4/587* (2013.01); *H01M 10/36* (2013.01); *H01M 10/4235* (2013.01); *H01M 10/44* (2013.01); *H02J 3/38* (2013.01); *H02J 3/383* (2013.01); *H02J 3/386* (2013.01); *H01M 2300/0002* (2013.01); *Y02B 10/30* (2013.01)

(58) Field of Classification Search
CPC ........ H01M 4/38; H01M 4/485; H01M 4/587; H01M 10/4235; H01M 10/44; H01M 4/58; H01M 4/505; H01M 10/36; H01M 4/463; H01M 4/525; H01M 2300/0002
See application file for complete search history.

(56) References Cited

U.S. PATENT DOCUMENTS 2,838,591 A 6/1958 Stokes
4,324,846 A 4/1982 Kaun et al.
(Continued)

FOREIGN PATENT DOCUMENTS

JP 2002-110153 A 4/2002
JP 2003-17058 A 1/2003
(Continued)

OTHER PUBLICATIONS

Machine translation of Kim—KR 2015-0030997 cited in IDS (Year: 2015).*
(Continued)

*Primary Examiner* — Nicholas P D'Aniello
(74) *Attorney, Agent, or Firm* — Choate, Hall & Stewart LLP; William R. Haulbrook; Michael D. Schmitt

(57) ABSTRACT

A rechargeable battery using a solution of an aluminum salt as an electrolyte is disclosed, as well as methods of making the battery and methods of using the battery.

23 Claims, 14 Drawing Sheets

Related U.S. Application Data continuation of application No. 15/290,599, filed on Oct. 11, 2016, now Pat. No. 9,819,220.

(60) Provisional application No. 62/238,935, filed on Oct. 8, 2015.

(51) Int. Cl.
| | |
|---|---|
| H01M 4/58 | (2010.01) |
| H02J 3/38 | (2006.01) |
| H01M 4/38 | (2006.01) |
| H01M 4/505 | (2010.01) |
| H01M 4/587 | (2010.01) |
| H01M 10/36 | (2010.01) |
| H01M 10/42 | (2006.01) |
| H01M 10/44 | (2006.01) |

(56) References Cited

U.S. PATENT DOCUMENTS

| | | |
|---|---|---|
| 5,077,152 A | 12/1991 | Yoshino et al. |
| 5,554,458 A | 9/1996 | Noda et al. |
| 5,571,600 A | 11/1996 | Licht |
| 6,103,421 A | 8/2000 | Torata et al. |
| 6,589,692 B2 | 7/2003 | Takami |
| 7,179,310 B2 | 2/2007 | Jiang et al. |
| 8,298,701 B2 | 10/2012 | Whitacre et al. |
| 8,652,672 B2 | 2/2014 | Whitacre et al. |
| 9,577,264 B2 | 2/2017 | Hatanaka et al. |
| 9,819,220 B2 | 11/2017 | Mukherjee et al. |
| 10,056,198 B2 | 8/2018 | Outlaw et al. |
| 10,559,855 B2 | 2/2020 | Mukherjee et al. |
| 10,916,963 B2 | 2/2021 | Mukherjee et al. |
| 2001/0028979 A1 | 10/2001 | Takami |
| 2002/0068222 A1 | 6/2002 | Ishii |
| 2003/0219650 A1 | 11/2003 | Saruwatari et al. |
| 2006/0068289 A1 | 3/2006 | Paulsen et al. |
| 2006/0174938 A1 | 8/2006 | Di Palma et al. |
| 2006/0257728 A1 | 11/2006 | Mortensen et al. |
| 2009/0081546 A1 | 3/2009 | Ogasawara et al. |
| 2009/0253025 A1 | 10/2009 | Whitacre |
| 2010/0151303 A1 | 6/2010 | Marple et al. |
| 2011/0052998 A1 | 3/2011 | Liang et al. |
| 2011/0076564 A1 | 3/2011 | Yu |
| 2011/0171524 A1 | 7/2011 | Shimamura et al. |
| 2012/0082904 A1 | 4/2012 | Brown et al. |
| 2012/0082905 A1 | 4/2012 | Brown et al. |
| 2012/0171574 A1 | 7/2012 | Zhamu et al. |
| 2013/0036603 A1 | 2/2013 | Christian |
| 2013/0280579 A1 | 10/2013 | Wright et al. |
| 2014/0045055 A1 | 2/2014 | Nakano et al. |
| 2014/0197684 A1 | 7/2014 | Masato et al. |
| 2014/0234715 A1 | 8/2014 | Fasching et al. |
| 2014/0242457 A1 | 8/2014 | Archer et al. |
| 2015/0021516 A1 | 1/2015 | Kwon |
| 2015/0062782 A1 | 3/2015 | Rzany et al. |
| 2015/0249261 A1 | 9/2015 | Dai et al. |
| 2015/0364789 A1 | 12/2015 | Ogawa et al. |
| 2016/0285095 A1 | 9/2016 | Kang |
| 2017/0214095 A1 | 7/2017 | Mukherjee et al. |
| 2017/0301960 A1 | 10/2017 | Menard et al. |
| 2018/0138554 A1 | 5/2018 | Mukherjee et al. |
| 2018/0226831 A9 | 8/2018 | Mukherjee et al. |
| 2020/0203987 A1 | 6/2020 | Mukherjee et al. |

FOREIGN PATENT DOCUMENTS

| | | |
|---|---|---|
| JP | 2014-222609 A | 11/2014 |
| KR | 10-2015-0030997 A | 3/2015 |
| WO | WO-2014/132251 A1 | 9/2014 |
| WO | WO-2014/137207 A1 | 9/2014 |
| WO | WO-2015/089272 A2 | 6/2015 |
| WO | WO-2017/062977 A1 | 4/2017 |
| WO | WO-2017/136545 A1 | 8/2017 |
| WO | WO-2018/071602 A1 | 4/2018 |
| WO | WO-2018/176063 A2 | 9/2018 |

OTHER PUBLICATIONS

Arora, P., et al., Battery Separators, Chemical Reviews, 104(10):4419-4462, (2004).

Cho, Young-Joo, et al., Aluminum anode for aluminum-air battery-Part I: Influence of aluminum purity, Journal of Power Sources 277:370-378, (2015).

Cui, H. et al., Factors Governing the Formation of Lithiophorite at Atmospheric Pressure, Clays and Clay Minerals, 57(3):353-360, (2009).

Egan, D. R., et al., Developments in electrode materials and electrolytes for aluminium-air batteries, Journal of Power Sources, 236:293-310, (2013).

Gheytani, S. et al., Chromate conversion coated aluminium as a lightweight and corrosionresistant current collector for aqueous lithium-ion batteries, J. Mater. Chem. A, 4(2):395-399, (2016).

Hey, M. J. et al., The salting-out effect and phase separation in aqueous solutions of electrolytes and poly(ethylene glycol), Polymer, 46:2567-2572, (2005).

International Search Report of the corresponding international patent application PCT/US2016/056394 (Rechargeable Aluminum Ion Battery, filed Oct. 11, 2016), 3 pages, dated Dec. 19, 2016.

International Search Report, Application No. PCT/US17/56229 (Rechargeable Aluminum Ion Battery, filed Oct. 11, 2018), issued by ISA/US, Commissioner of Patents, 5 pages, dated Feb. 13, 2018.

Jayaprakash, S. K. D. and Archer, L. A., The rechargeable aluminum-ion battery, Chem. Commun., 47:12610-12612, (2011).

Jiang, Y. et al., Pseudocapacitive layered birnessite sodium manganese dioxide for high-rate non-aqueous sodium ion capacitors, Royal Society of Chemistry, Journal of Materials Chemistry A, DOI: 10.1039/c8ta02516a, 8 pages, (2018).

Jiao, F. and Bruce, P. G., Mesoporous Crystalline β-MnO2—a Reversible Positive Electrode for Rechargeable Lithium Batteries**, Advanced Materials, 19:657-660, (2007).

Li, Z. et al., Reversible Aluminum-Ion Intercalation in Prussian Blue Analogs and Demonstration of a High-Power Aluminum-Ion Asymmetric Capacitor, Advanced Energy Materials, 1401410:1-6, (2014) with 5 pages of Supporting Information.

Lin, M.-C., et al., An ultrafast rechargeable aluminium-ion battery, Nature, 520(7547):324-328, (2015).

Lin, Meng-Chang et al., An ultrafast rechargeable aluminium-ion battery, Nature, doi:10.1038/nature14340, 520:324-328, (2015).

Mori, R., A new structured aluminium-air secondary battery with a ceramic aluminium ion conductor, RSC Advances, 3:11547-11551, (2013).

Mukherjee, R. et al., Defect-induced plating of lithium metal within porous graphene networks, Nature Communications, 5(3710):1-26, Apr. 22, 2014 [retrieved on Jan. 13, 2017].

Peng, T. et al., Control Growth of Mesoporous Nickel Tungstate Nanofiber and its Application as Anode Material for Lithium-Ion Batteries, Electrochimica Acta 224:460-467, (2017).

Reed, Luke, Aluminum ion batteries: electrolytes and cathodes, Ph.D. Thesis, University of California, Merced, 127 pages, (2015).

Sander, J. S. et al., High-performance battery electrodes via magnetic templating, Nature Energy, Article 16099, 1:1-7, (2016).

Tan, Y., et al., Facile Synthesis of Manganese-Oxide-Containing Mesoporous Nitrogen-Doped Carbon for Efficient Oxygen Reduction, Advanced Functional Materials, 22:4584-4591, (2012).

Thackeray, M. M. et al., Electrochemical Extraction of Lithium From LiMn$_2$O$_4$, National Institute for Material Research, 19(2):179-187, (1984).

Van Der Kuijp, T. J., et al.,. Health hazards of China's lead-acid battery industry: a review of its market drivers, production processes, and health impacts, Environmental Health, 12(61):1-10, (2013).

Whittingham, M.S.,. Lithium batteries and cathode materials, Chemical Reviews, 104(10):4271-4302, (2004).

(56) References Cited

OTHER PUBLICATIONS

Written Opinion of the International Search Authority of the corresponding international patent application PCT/US2016/056394 (Rechargeable Aluminum Ion Battery, filed Oct. 11, 2016), 9 pages, dated Dec. 19, 2016.
Written Opinion, Application No. PCT/US17/56229 (Rechargeable Aluminum Ion Battery, filed Oct. 11, 2018), issued by ISA/US, Commissioner of Patents, 8 pages, dated Feb. 13, 2018.
Wu, C. et al., Electrochemically activated spinel manganese oxide for rechargeable aqueous aluminum battery, Nature Communications, 10:73, 10 pages, (2019).
Yang, Z., et al. Electrochemical Energy Storage for Green Grid, Chemical Reviews, 111(5):3577-3613, (2011).
Professional Machine translation of Kim—KR2015-0030997 cited in IDS (Year:2015).
Faegh, E. et. al., Practical assessment of the performance of aluminium battery technologies, Nature Energy, 6:21-29, (2021).
Liu, S., et. al., Aluminum storage behavior of anatase TiO2 nanotube arrays in aqueous solution for aluminum ion batteries, Energy & Environmental Science. 5:9743-9746, (2012).

\* cited by examiner

RECHARGEABLE ALUMINUM ION BATTERY

CROSS-REFERENCE TO RELATED APPLICATIONS

This application is a continuation of U.S. patent application Ser. No. 15/693,926, filed on Sep. 1, 2017, which is a continuation of U.S. patent application Ser. No. 15/290,599, filed Oct. 11, 2016, which claims benefit under 35 U.S.C. § 119 of U.S. Provisional Patent Application No. 62/238,935, filed Oct. 8, 2015, the contents of each of which are hereby incorporated by reference.

BACKGROUND OF THE INVENTION

Field of the Invention

The present disclosure relates to rechargeable batteries using charge carriers comprising aluminum ions, and particularly batteries with reduced toxic components to minimize human health hazards and environmental damage.

Description of the Background

With an increase in interest in generating electricity from renewable energy sources such as wind and solar, it has become increasingly important to identify a viable battery storage system. Lead acid batteries, for instance, are the most widely used battery technology for grid storage owing to their low cost (about $100-$150/kWh). However, lead acid batteries have a comparatively low gravimetric energy density (30-50 Wh/kg) and a poor cycle life, between 500 and 1000 charge/discharge cycles, based on the low depths of discharge (50-75%). In addition, lead acid batteries have significant safety problems associated with handling and disposal, due to the presence of sulfuric acid and toxic lead components. Reports of increased lead poisoning and acid-related injuries among workers and children exposed to unsafe handling and disposal of lead acid batteries, have raised strong concerns over large-scale implementation of lead acid batteries as storage for electricity generated from renewable energy sources.

The search for economical alternatives for electrical storage that lack the environmental and health risks of lead acid batteries has not been successful. One alternative, sodium ion batteries, are estimated to reach a price of about $250/kWh by 2020, but the volumetric energy density of sodium ion battery technology is lower than that of lead acid batteries at less than about 30 Wh/L.

Another alternative, vanadium redox flow batteries, offer high capacity, long discharge times and high cycle life, but have relatively low gravimetric and volumetric energy densities, and are expensive due to the high cost of vanadium and other components. Liquid metal batteries on the other hand are based on ion exchange between two immiscible molten salt electrolytes, but must operate at high temperatures, up to 450° C., rely on a complicated lead-antimony-lithium composite for ion exchange, and such systems have problems of flammability and toxicity.

SUMMARY OF THE INVENTION

A rechargeable battery using an electrolyte comprising aluminum ions is disclosed, as well as methods of making the battery and methods of using the battery.

In certain embodiments, a battery is disclosed that includes an anode comprising aluminum, an aluminum alloy or an aluminum compound, a cathode, a porous separator comprising an electrically insulating material that prevents direct contact of the anode and the cathode, and an electrolyte comprising a solution of an aluminum salt, wherein the electrolyte is in electrical contact with the anode and the cathode. In preferred embodiments, the battery is a rechargeable battery, that is, a secondary battery.

In certain embodiments, the anode is an aluminum alloy comprising aluminum and at least one element selected from the group consisting of manganese, magnesium, lithium, zirconia, iron, cobalt, tungsten, vanadium, nickel, copper, silicon, chromium, titanium, tin and zinc. In certain embodiments, the anode is aluminum that has received a treatment that is effective to increase the hydrophilic properties of the anode surface that is in contact with the electrolyte. In certain embodiments, the surface treatment comprises the step of contacting a surface of the aluminum with an aqueous solution of an alkali metal hydroxide. Typically, the alkali metal hydroxide selected from the group consisting of lithium hydroxide, sodium hydroxide, potassium hydroxide and mixtures thereof. In certain embodiments, anode is an aluminum metal foil or an aluminum alloy foil.

In certain embodiments, the anode is an aluminum compound selected from the group consisting of an aluminum transition metal oxide ($Al_xM_yO_z$, where M is a transition metal selected from the group consisting of iron, vanadium, titanium, molybdenum, copper, nickel, zinc, tungsten, manganese, chromium, cobalt and mixtures thereof and x, y, and z range from 0 to 8, inclusive); an aluminum transition metal sulfide, ($Al_xM_yS_z$, where M is a transition metal selected from the group consisting of iron, vanadium, titanium, molybdenum, copper, nickel, zinc, tungsten, manganese, chromium, cobalt and mixtures thereof and x, y, and z range from 0 to 8, inclusive); aluminum lithium cobalt oxide ($AlLi_3CoO_2$); lithium aluminum hydride ($LiAlH_4$); sodium aluminum hydride ($NaAlH_4$); potassium aluminum fluoride ($KAlF_4$); and mixtures thereof.

In certain embodiments, the electrolyte is an aqueous solution of an aluminum salt selected from the group consisting of aluminum nitrate, aluminum sulfate, aluminum phosphate, aluminum bromide hexahydrate, aluminum fluoride, aluminum fluoride trihydrate, aluminum iodide hexahydrate, aluminum perchlorate, aluminum hydroxide, and combinations thereof. In certain embodiments, the molarity of the aluminum salt ranges from 0.05 M to 5 M and the concentration of water ranges from 5 weight % to 95 weight %.

In certain embodiments, the electrolyte further comprises an alkali metal hydroxide selected from the group consisting of lithium hydroxide, sodium hydroxide, potassium hydroxide, ammonium hydroxide, calcium hydroxide, magnesium hydroxide and mixtures thereof. In certain embodiments, the electrolyte comprises an aqueous solution of aluminum nitrate and lithium hydroxide in a molar ratio of about 1:1 to about 1:10. In certain embodiments, the electrolyte comprises a polymer selected from the group consisting of polytetrafluoroethylene, acetonitrile butadiene styrene, styrene butadiene rubber, ethyl vinyl acetate, poly(vinylidene fluoride-co-hexafluoropropylene), polymethyl methacrylate, and mixtures thereof.

In certain embodiments, the electrolyte comprises an aluminum halide selected from the group consisting of aluminum chloride, aluminum bromide, aluminum iodide, and mixtures thereof and a 1-ethyl methylimidazolium halide selected from the group consisting of 1-ethyl methylimidazolium chloride, 1-ethyl methylimidazolium bromide, 1-ethyl methylimidazolium iodide and mixtures thereof. In certain embodiments, the aluminum halide and the 1-ethyl methylimidazolium halide are present in the ratio of 1:1 to 5:1 (weight:weight).

In certain embodiments, the electrolyte comprises a solvent selected from the group consisting of water, ethanol, N-methyl pyrrolidone, dimethyl sulfoxide and mixtures thereof.

In certain embodiments, the cathode comprises a material selected from the group consisting of lithium manganese oxide, acid-treated lithium manganese oxide, lithium metal manganese oxide (where the metal is selected from the group consisting of nickel, cobalt, aluminum, chromium and combinations thereof), acid-treated lithium metal manganese oxide, graphite metal composite (where the metal is an electrically conductive metal selected from the group consisting of nickel, iron, copper, cobalt, chromium, aluminum and mixtures thereof), graphite-graphite oxide, manganese dioxide and graphene. In certain preferred embodiments, cathodes comprising lithium have been subjected to acid treatment. In certain preferred embodiments, the anode comprises aluminum metal, the cathode comprises graphite-graphite oxide, and the aluminum salt comprises aluminum nitrate. In other preferred embodiments, the anode comprises aluminum metal, the cathode comprises acid-treated lithium manganese oxide, and the aluminum salt comprises aluminum nitrate.

In certain embodiments, the porous separator comprises a material selected from the group consisting of polyethylene, polytetrafluoroethylene, polyvinyl chloride, ceramic, polyester, rubber, polyolefins, glass mat, polypropylene, a mixed cellulose ester, nylon, glass microfiber and mixtures and combinations thereof. The separators may be treated with or mixed with hydrophilic functional groups, monomers or polymers, including but not limited to acrylic acid, diethyleneglycol-dimethacrylate, cellulose acetate and silicon oxide, in order to introduce hydrophilicity for use with aqueous electrolytes. In certain embodiments, the porous separator has an average pore size of about 0.067 µm to about 1.2 µm.

In certain embodiments, a battery is disclosed that comprises an anode comprising aluminum, an aluminum alloy comprising aluminum and at least one element selected from the group consisting of manganese, magnesium, lithium, zirconia, iron, cobalt, tungsten, vanadium, nickel, copper, silicon, chromium, titanium, tin and zinc; an aluminum compound selected from the group consisting of an aluminum transition metal oxide ($Al_xM_yO_z$, where M is a transition metal selected from the group consisting of iron, vanadium, titanium, molybdenum, copper, nickel, zinc, tungsten, manganese, chromium, cobalt and mixtures thereof and x, y, and z range from 0 to 8, inclusive); an aluminum transition metal sulfide, ($Al_xM_yS_z$, where M is a transition metal selected from the group consisting of iron, vanadium, titanium, molybdenum, copper, nickel, zinc, tungsten, manganese, chromium, cobalt and mixtures thereof and x, y, and z range from 0 to 8, inclusive); aluminum lithium cobalt oxide ($AlLi_3CoO_2$); lithium aluminum hydride ($LiAlH_4$); sodium aluminum hydride ($NaAlH_4$); potassium aluminum fluoride ($KAlF_4$); or mixtures thereof; a cathode comprising a material selected from the group consisting of lithium manganese oxide, acid-treated lithium manganese oxide, lithium metal manganese oxide (where the metal is selected from the group consisting of nickel, cobalt, aluminum, chromium and combinations thereof), acid-treated lithium metal manganese oxide, graphite metal composite (where the metal is an electrically conductive metal selected from the group consisting of nickel, iron, copper, cobalt, chromium, aluminum and mixtures thereof), graphite-graphite oxide, manganese dioxide and graphene; and an electrolyte comprising an aqueous solution of an aluminum salt selected from the group consisting of aluminum nitrate, aluminum sulfate, aluminum phosphate, aluminum bromide hexahydrate, aluminum fluoride, aluminum fluoride trihydrate, aluminum iodide hexahydrate, aluminum perchlorate, aluminum hydroxide, and combinations thereof. In certain embodiments, the molarity of the aluminum salt ranges from 0.05 M to 5 M and the concentration of water ranges from 5 weight % to 95 weight %. Typically, the battery further comprises a porous separator comprising an electrically insulating material that prevents direct contact of the anode and the cathode. In certain embodiments, the porous separator comprises a material selected from the group consisting of polyethylene, polytetrafluoroethylene, polyvinyl chloride, ceramic, polyester, rubber, polyolefins, glass mat, polypropylene, a mixed cellulose ester, nylon, glass microfiber and mixtures and combinations thereof. The separators maybe treated with or mixed with hydrophilic functional groups, monomers or polymers, including but not limited to acrylic acid, diethyleneglycol-dimethacrylate, cellulose acetate and silicon oxide, in order to introduce hydrophilicity for use with aqueous electrolytes. In certain embodiments, the porous separator has an average pore size of about 0.067 µm to about 1.2 µm.

Also disclosed are methods of using a rechargeable battery that includes an anode comprising aluminum, an aluminum alloy or an aluminum compound, a cathode, a porous separator comprising an electrically insulating material that prevents direct contact of the anode and the cathode and an electrolyte comprising an aqueous solution of an aluminum salt. In certain embodiments, a system is disclosed that includes at least one such rechargeable battery that is operatively connected to a controller, wherein the controller is adapted to be operatively connected to a source of electrical power and to a load. In certain embodiments, the controller is effective to control the charging of the battery by the source of electrical power. In certain embodiments, the controller is effective to control the discharging of the battery by the load. In certain embodiments, the controller is adapted to provide a discharge pattern that is a combination of high and low current density galvanostatic steps. In certain embodiments, the source of electrical power is a solar panel or wind-powered generator. In certain embodiments, the load is a local electrical load or a power distribution grid.

The above described and other features are exemplified by the following figures and detailed description.

BRIEF DESCRIPTION OF THE DRAWINGS

The foregoing and other features and advantages will be apparent from the following more particular description of exemplary embodiments of the disclosure, as illustrated in the accompanying drawings, in which like reference characters refer to the same parts throughout the different views. The drawings are not necessarily to scale, emphasis instead being placed upon illustrating the principles of the disclosure.

were tested at 20 µA/cm$^2$, 40 µA/cm$^2$ and 50 µA/cm$^2$; and glass microfiber separators (diamonds) were tested at 20 µA/cm$^2$ and 40 µA/cm$^2$.

Figure 13:
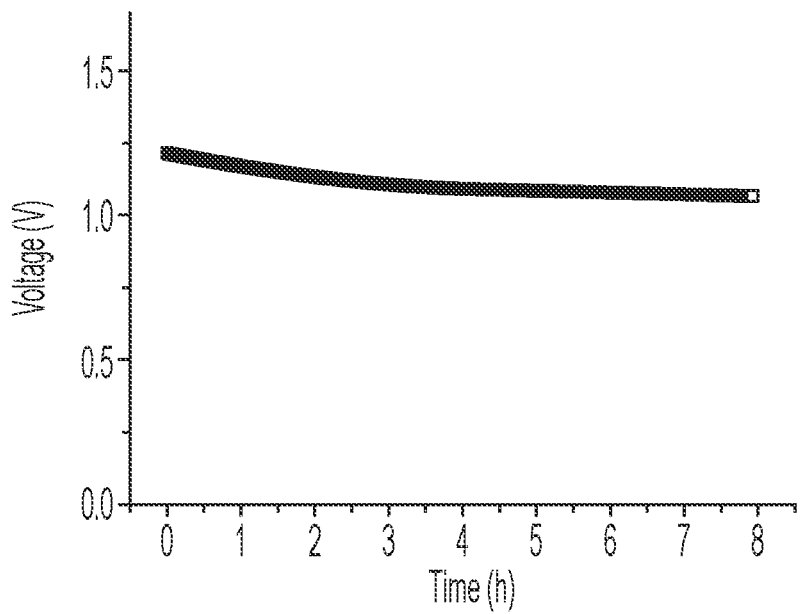

FIG. 13 illustrates the discharge of a battery having a polypropylene separator with 0.067 µm pores at a current density of 10 µA/cm$^2$. The battery was assembled in a 2032 coin cell format and had an anode comprising an aluminum foil treated with LiOH as described in Example 1, a cathode comprising acid-treated lithium manganese oxide, and the electrolyte was an 0.5 M aqueous aluminum nitrate solution.

Figure 14:
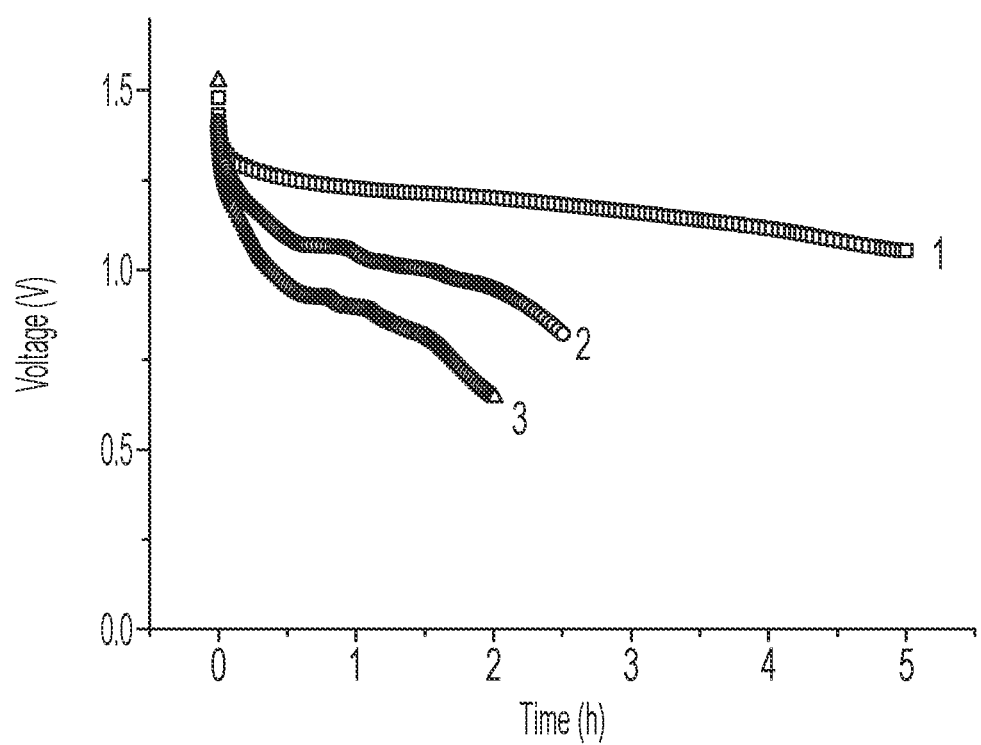

FIG. 14 illustrates the discharge of a battery having a nylon separator with 0.80 µm pores at a current densities of 20 µA/cm$^2$ (curve 1), 40 µA/cm$^2$ (curve 2), and 40 µA/cm$^2$ (curve 3). The battery was assembled in a 2032 coin cell format and had an anode comprising an aluminum foil treated with LiOH as described in Example 1, a cathode comprising acid-treated lithium manganese oxide, and the electrolyte was an 0.5 M aqueous aluminum nitrate solution.

Figure 15:
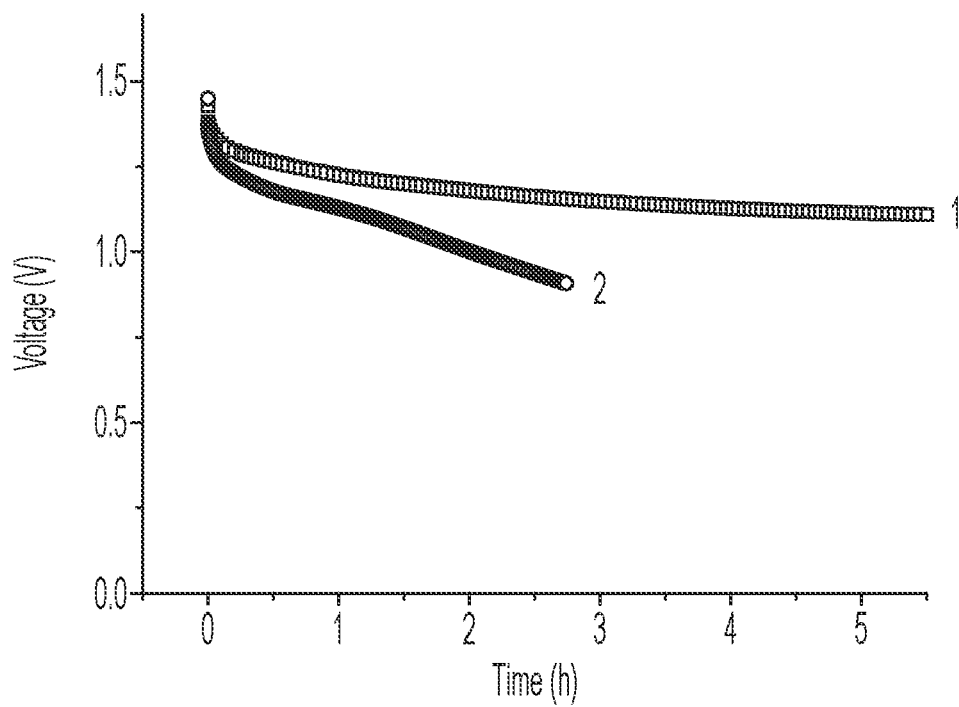

FIG. 15 illustrates the discharge of a battery having a glass microfiber separator with 1.0 µm pores at a current densities of 20 µA/cm$^2$ (curve 1) and 40 µA/cm$^2$ (curve 2). The battery was assembled in a 2032 coin cell format and had an anode comprising an aluminum foil treated with LiOH as described in Example 1, a cathode comprising acid-treated lithium manganese oxide, and the electrolyte was an 0.5 M aqueous aluminum nitrate solution.

Figure 16:
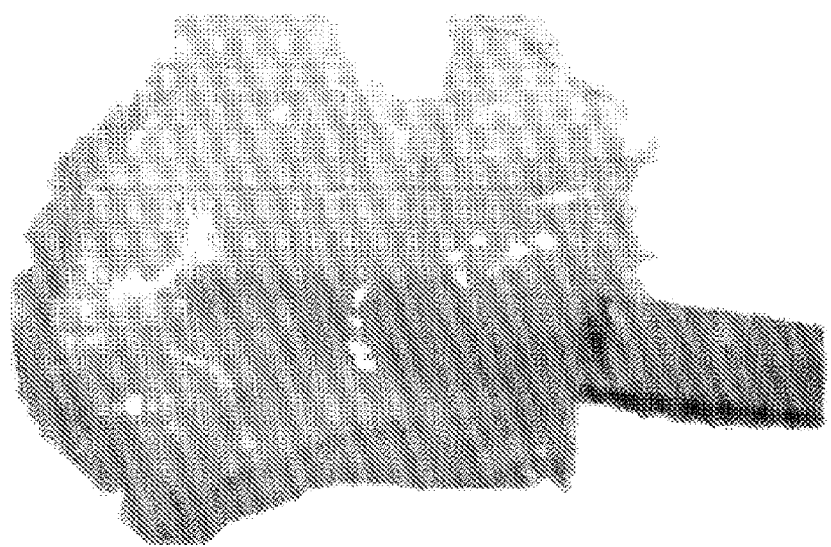

FIG. 16 is a photograph of the free-standing, translucent solid polymer electrolyte measuring about 1 mm in thickness and about 3 cm in diameter.

Figure 17:
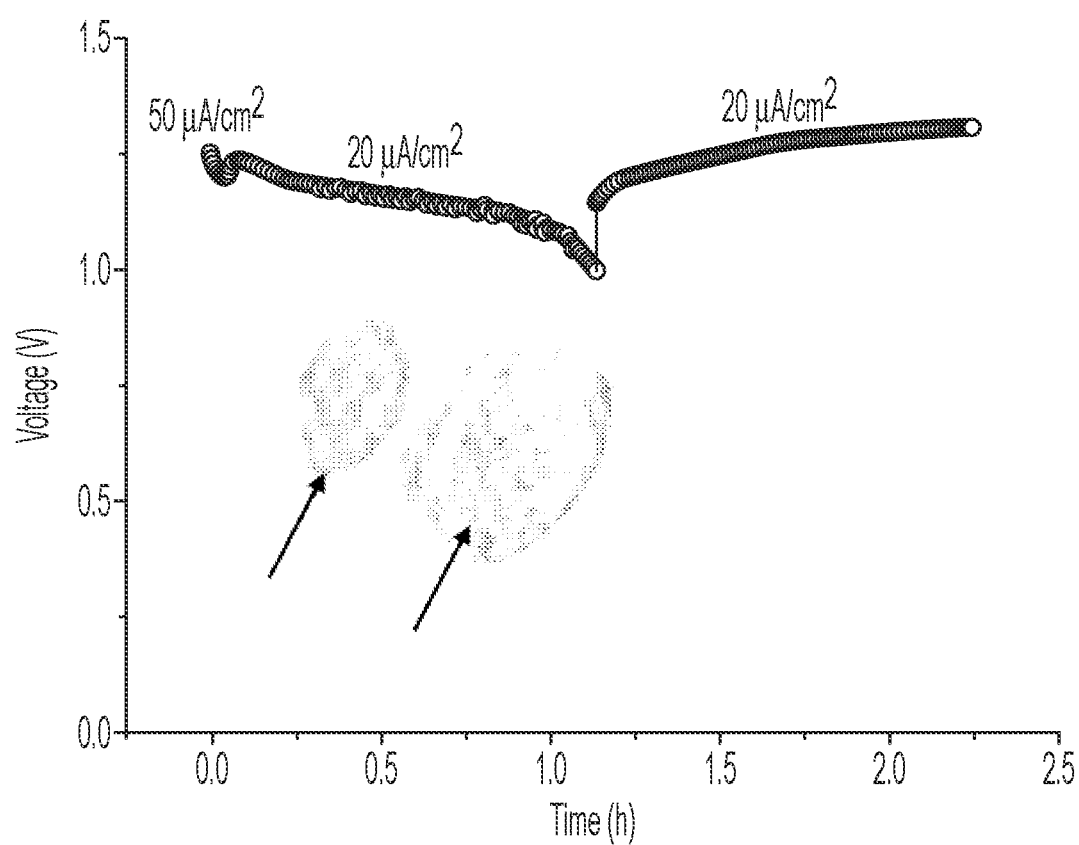

FIG. 17 illustrates the voltage profile of a battery having a solid polymer electrolyte, showing a short duration of discharge at 50 µA/cm$^2$, followed by discharging at 20 µA/cm$^2$ and charging at a current density of 20 µA/cm$^2$, with an inset of a photograph of solid polymer electrolytes. The battery was assembled in a 2032 coin cell format and had an anode comprising an aluminum foil treated with LiOH as described in Example 1, a cathode comprising acid-treated lithium manganese oxide, and a 25 µm thick polypropylene separator with an average pore size of 0.067 µm. The surface of the cathode was further treated with 2 M LiOH prior to assembly and testing. The electrolyte was prepared by mixing 6.7 weight % poly(vinylidene fluoride-co-hexafluoropropylene) (PVDF-HFP), 20 weight % aluminum nitrate and 10 weight % LiOH in 73.3 weight % deionized water. The solution was then placed inside a furnace maintained at 120° C. overnight to remove the water content and obtain the resultant solid polymer electrolyte.

Figure 18:
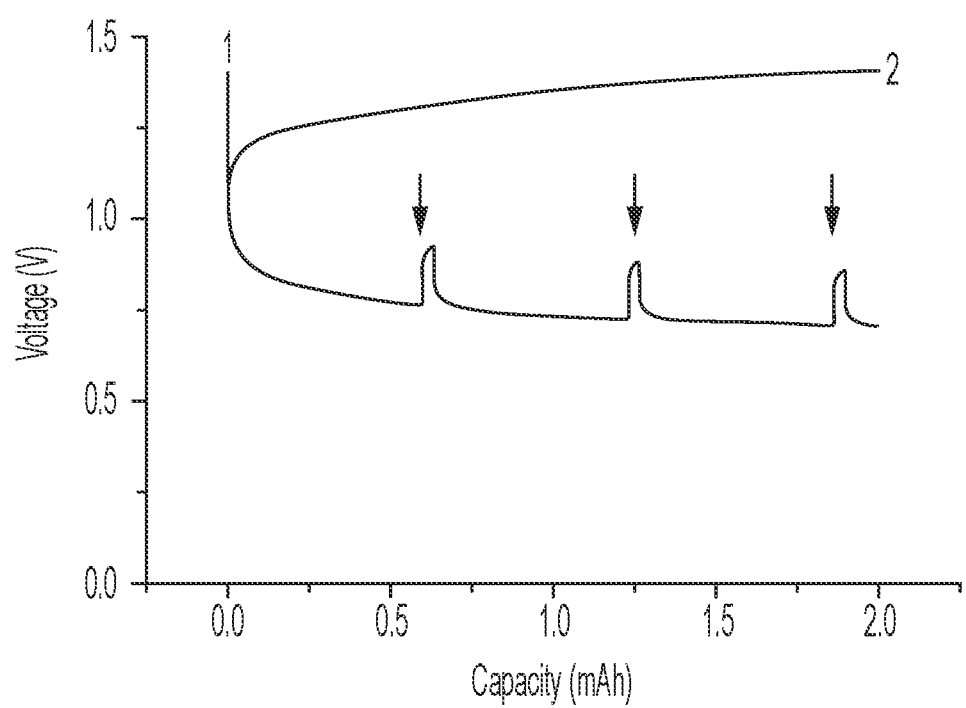

FIG. 18 shows a discharge profile produced by a combination of low-current and high-current pulses. The battery was assembled in a 2032 coin cell format and had an anode comprising an aluminum foil treated with LiOH as described in Example 1, a cathode comprising acid-treated lithium manganese oxide, a 0.5 M aluminum nitrate (aq) electrolyte and a 25 µm thick polypropylene separator with an average pore size of 0.067 µm. The current densities were switched between 100 A/g (low-current pulse) and 500 A/g (high-current pulse), where the current is normalized with respect to the mass of the cathode.

DETAILED DESCRIPTION OF PREFERRED EMBODIMENTS

The following non-limiting examples further illustrate the various embodiments described herein.

The aluminum ion battery chemistry described in this disclosure relies on simple electrode and aqueous electrolyte chemistry and is based on the movement of hydroxyaluminates between an aluminum anode source and a host cathode material. Incorporation of aluminum anode and graphite or acid-treated lithium manganese oxide cathode, along with an aqueous electrolyte comprising an inexpensive aluminum salt ensures cost-competitiveness of the technology. Aluminum is abundantly available and is inherently safer and electrochemically more robust compared to lithium metal, facilitating the use in aqueous environments as well as ambient atmospheric conditions in a safe and reliable manner. Moreover, the approach adopted here to incorporate hydrophilicity to aluminum-based anodes is inexpensive and highly scalable. Both carbon and lithium manganese oxide cathodes are easy to manufacture and are considered to be extremely safe over a wide range of operating conditions and are compatible with a wide range of aqueous, non-aqueous, ionic and solid electrolytes, lending flexibility and scalability to the battery technology. Moreover the use of air stable electrodes and aqueous electrolytes is expected to significantly reduce the time, cost and complexity of manufacturing of the proposed aluminum ion aqueous battery relative to other competing battery chemistries that rely on elaborate manufacturing and assembly techniques, often in humidity-controlled dry room environments. The preliminary performance parameters indicate excellent reliability and repeatability. The estimated volumetric and gravimetric energy density are about 30 Wh/L and 75 Wh/kg respectively for the aluminum-graphite system and 50 Wh/L and 150 Wh/kg respectively for the aluminum-acid-treated lithium manganese oxide system, normalized with respect to the mass and volume of cathode, thereby offering significant advancements over alternate emerging battery technologies.

In general, multivalent ion transfer has been a holy grail for battery technology. In the commercially available lithium ion battery, an electron removed from lithium metal travels through the external load while a corresponding single equivalent charged ion is transferred between the anode and cathode of the battery through the electrolyte. For a long time, efforts to increase energy density have sought to transfer an equivalent ion between the electrodes when multiple electrons are removed from an atom of a metal such as magnesium, calcium, zinc, aluminum, manganese, or vanadium. Such an approach has the potential to linearly scale energy density in proportion to the number of electrons removed from each atom. However, such efforts have not been successful, as multivalent ions are inherently highly reactive and cannot be successfully transported through the electrolyte to the counter electrode. The present inventors have developed an innovative solution to this challenging problem by transforming a multivalent ion into a single monovalent ion which is much easier to transport to the counter electrode. As disclosed herein, this concept is broadly applicable across various types of multivalent ions. In the disclosed embodiments, while three electrons are removed from an aluminum atom, instead of carrying a single ion with equivalent charge, the aluminum ion (Al$^{3+}$) combines with hydroxides to form a single ion with only a single charge (Al(OH)$_4^{1-}$) that is transported to the counter electrode. While not wishing to be bound by theory, it is believed that this approach eliminates the problem associated with the highly reactive multivalent ions and yet has the ability to linearly scale the energy density when multiple electrons are removed from a metal. In other embodiments, a multivalent ion could be transformed into more than one type of monovalent ions subject to the chemistry deployed. In further embodiments, a multivalent ion, such as an ion of +3, can be transformed into ions that are either monovalent or multivalent type having reduced valence or combinations thereof.

As used herein, "aluminum" and "aluminium" are used interchangeably to refer to the same element. "Aluminum" is the preferred term that is used.

As used herein, "aluminum ion" includes polyatomic aluminum anions, such as the hydroxyaluminate anion, $Al(OH)_4^{1-}$, the tetrachloroaluminate ion, $AlCl_4^{1-}$, the tetrahydroaluminate ion, $AlH_4^{1-}$, and the hexafluoroaluminate ion, $AlF_6^{1-}$.

As used herein, "delithiation" or "delithiated" refers to the removal of lithium from a compound including lithium, such as lithium manganese oxide, including removal by chemical methods, such as acid treatment, electrochemical methods or a combination of chemical and electrochemical methods. The product of the delithiation of lithium manganese oxide can be expressed as $Li_{1-x}MnO_2$, where x denotes the amount of lithium removed by the delithiation method. As the delithiation method approaches complete removal of lithium, x approaches 1, and the product is substantially $MnO_2$. In certain embodiments, the product is substantially $MnO_2$.

The next generation of energy storage technology should therefore enable elimination of the aforementioned disadvantages while simultaneously facilitating lower costs. A list of the desirable attributes have been provided in Table 1, below. In addition, the US Department of Energy has also specified four specific challenges to large-scale deployment of energy storage for grids: (1) cost-competitive technology, (2) validated reliability and safety, (3) equitable regulatory environment, and (4) industry acceptance.

TABLE 1

An overview of the desired attributes of next generation battery systems and their potential impacts

| Characteristic | Impact |
| --- | --- |
| High operating voltages | Fewer cells in series; Lower costs of implementation; Ability to integrate in a wide range of applications including consumer electronics |
| Characteristic voltage plateau | Simplified battery management systems |
| Simple electrode and electrolyte components | Ease of manufacturing; Enhanced safety; Lower cost |
| Room temperature operation | Improved safety |
| Minimal external accessories (insulation, cooling, pumps, storage tanks, etc.) | Easy maintenance; Lower cost |

The aluminum-ion battery storage technology is based on the movement of aluminum ions between an anode and a cathode, through an aqueous electrolyte and a separator that is permeable to the aluminum ions. In certain embodiments, the aluminum ions are polyatomic aluminum anions. In certain embodiments, the separator is a polymeric material. A porous, at least partially hydrophilic polymer separator provides an insulating separation layer between the anode and cathode, thereby preventing potential shorting between the two electrodes. In certain embodiments, the polymer separator is a polypropylene, cellulose ester or nylon separator. The porosity of the separator is adapted to facilitate the movement of the aluminum ions between the anode and cathode.

Aluminum electrochemistry has several advantages over the other battery technologies that are available today. Aluminum has a theoretical energy density of 1060 Wh/kg, compared to 406 Wh/kg of lithium ions, due to the presence of three valence electrons in aluminum as compared to one valence electron in lithium. Aluminum is the third most abundant element (after oxygen and silicon), and the most abundant metal available in the earth's crust (8.1 weight %), compared to lithium (0.0017 weight %), sodium (2.3 weight %) and vanadium (0.019 weight %), providing an opportunity to reduce material costs. Finally, aluminum is both mechanically and electrochemically robust and can be safely operated in ambient air as well as humid environments while simultaneously facilitating a greater flexibility in the choice of electrolytes (aqueous, organic, ionic and solid) and operating conditions.

While aluminum is the preferred element, other electrochemically active elements that form hydroxides that possess sufficient ionic mobility and electrical conductivity may also be used. Such elements include alkali metals such as lithium, sodium and potassium, alkaline earth metals such as calcium and magnesium, transition metals such as manganese, and post-transition metals such as tin.

In certain embodiments, the electrolyte comprises an aqueous solution of an aluminum salt. A preferred solvent is deionized water. In certain embodiments, the aluminum salts include aluminum nitrate, aluminum sulfate, aluminum phosphate, aluminum bromide hexahydrate, aluminum fluoride, aluminum fluoride trihydrate, aluminum iodide hexahydrate, aluminum perchlorate, aluminum hydroxide, and combinations thereof. Preferred aluminum salts are aluminum nitrate, aluminum bromide hexahydrate, aluminum fluoride, aluminum iodide hexahydrate, and combinations thereof. In an embodiment, the aluminum salt is aluminum nitrate.

In certain embodiments, the aluminum salt is present in an aqueous solution of about 0.05 M to about 5.0 M. In some embodiments, the aluminum salt is present in an aqueous solution of about 0.5 M to about 3.0 M. In certain embodiments, the electrolyte comprises about 0.1M to about 3.0 M sodium nitrate aqueous solution. In certain preferred embodiments, the electrolyte comprises about 1M to about 3.0 M sodium nitrate (aqueous).

One of ordinary skill would recognize that the aqueous aluminum salt electrolyte is environmentally benign, non-toxic and non-flammable and is therefore safer than organic electrolytes used in commercial lithium ion batteries and many sodium ion batteries today.

In certain embodiments, an anode comprises aluminum metal foils. In preferred embodiments the aluminum metal foil has been treated to increase its hydrophilic properties. In other embodiments, an anode comprises an aluminum compound selected from the group consisting of an aluminum transition metal oxide ($Al_xM_yO_z$, where M is a transition metal selected from the group consisting of iron, vanadium, titanium, molybdenum, copper, nickel, zinc, tungsten, manganese, chromium, cobalt and mixtures thereof and x, y, and z range from 0 to 8, inclusive); an aluminum transition metal sulfide, ($Al_xM_yS_z$, where M is a transition metal selected from the group consisting of iron, vanadium, titanium, molybdenum, copper, nickel, zinc, tungsten, manganese, chromium, cobalt and mixtures thereof and x, y, and z range from 0 to 8, inclusive); aluminum lithium cobalt oxide ($AlLi_3CoO_2$); lithium aluminum hydride ($LiAlH_4$); sodium aluminum hydride ($NaAlH_4$); potassium aluminum fluoride ($KAlF_4$); and mixtures thereof.

In certain embodiments, an anode comprises an alloy of aluminum and one or more metals selected from the group consisting of lithium, sodium, potassium, manganese and magnesium and combinations thereof. In certain embodiments, the anode comprises an aluminum alloy comprising aluminum and at least one element selected from the group consisting of manganese, magnesium, lithium, zirconia, iron, cobalt, tungsten, vanadium, nickel, copper, silicon, chromium, titanium, tin, zinc and combinations thereof. The operating voltage in batteries that use carbon-based cathodes could be increased through the incorporation of high activation energy alloy anodes.

Improvement of cathode materials can be gained by introduction of porosity and voids or modifications in the grain structure and orientation within the existing graphite or acid-treated lithium manganese oxide compositions. Such improvements can provide a more efficient movement and storage of larger charged ions in the discharge reaction, thereby increasing the net capacity of the battery.

Alternatives to aluminum anodes, such as aluminum metal sulfides and aluminum metal oxides can potentially offer higher operating voltages, associated with the high activation energy of such compounds. Moreover, such alternatives also facilitate the incorporation of a mixed, hybrid-ion technology whereby the capacity contribution is available from more than one metal ion, thereby directly increasing the achievable capacities and hence, available energy densities. Such alternatives to aluminum anodes are also more stable over a wider range of operating parameters such as mechanical stresses, high/low operating temperatures and choice of electrolytes.

Examples of the chemical reactions associated with aluminum metal oxides is provided below:

$$Al_2CoO_4 \rightarrow AlCoO_4 + Al^{3+} + 3e \qquad (1)$$

Where cobalt changes its oxidation state from $Co^{3+}$ to $Co^{5+}$ following the dissociation reaction of cobalt aluminate and the release of one aluminum ion.

$$AlLi_3CoO_2 \rightarrow CoO_2 + Al^{3+} + 3Li^+ + 6e \qquad (2).$$

Cobalt changes its oxidation state from $Co^{2+}$ to $Co^{4+}$ following the dissociation reaction and the release of one aluminum ion and three lithium ions.

In embodiments using aluminum compounds comprising alkali metals, the following reactions can be considered.

$$AlH_4^{1-} + Na^{1+} \rightarrow NaH + AlH_3 \qquad (3).$$

$$AlF_6^{3-} + 3Li^{1+} \rightarrow Li_3F_3AlF_3 \qquad (4).$$

Aqueous electrolytes containing a dispersion of alternate aluminum salts (such as sulfates, phosphates and perchlorates) can effect changes in ionic mobility and operating voltages.

In addition to aqueous electrolytes, ionic electrolytes offer the ability to achieve significantly higher operating voltages (typically, >5 V), thereby increasing the achievable energy density (defined as the product of charge storage and operating voltage). Solid electrolytes, comprising aluminum and aluminum-metal-based salts dispersed in polymers such as polyethylene oxides are used in the disclosed aluminum ion battery chemistry. Solid electrolytes are low cost alternatives to ionic electrolytes that allow reasonably high operating voltages along with a marked improvement in terms of ionic mobility.

In certain embodiments, the separator is a porous polypropylene separator or a nylon membrane separator that provides an insulating layer between the anode and cathode along and provides sufficient porosity for the efficient transport of ions between the two electrodes. In certain embodiments, the separator comprises a porous polymer material selected to provide the needed functionality at lesser expense, which can significantly drive down the cost of the technology.

The onset, extent and impact of electrolysis within the battery chemistry has been studied. The current set of operating parameters rely on relatively low voltages at which electrolysis will be absent or at the most, inconsequential. However, the choice of electrodes and electrolytes bring in a sufficient degree of thermodynamic non-ideality factor which can increase the electrolysis voltage to as much as 1.8 V (instead of 1.23 V). Such high operating voltages with aqueous electrolytes not only enable higher capacities but can also lead to the introduction of additional reaction mechanisms which were otherwise unavailable at voltages less than 1.2 V. In terms of hybrid ion battery chemistries, higher operating voltage can also introduce the involvement of multiple metal ions such as lithium ions from the lithium manganese oxide cathode. Further studies throughout an entire range of operating parameters to determine the characteristic responses of the battery technology.

Cathode Materials. Two cathode materials were studied in working examples: acid-treated lithium manganese oxide and graphite-graphite oxide composite. A suitable cathode material should have sufficient porosity and inter-sheet voids to accommodate the insertion and intercalation of large polyatomic aluminum anions. The cathode material should also be partially hydrophilic for wettability with an aqueous electrolyte. These two cathode materials meet these criteria, but other materials, notably graphene and manganese dioxide, could also meet these criteria.

Pristine graphite cathodes do not typically provide large inter-sheet voids and porosity or hydrophilicity. While oxygen plasma treated graphite could improve the hydrophilicity of the cathode material, there is an issue of whether inter-sheet voids would accommodate large polyatomic aluminum anions.

The spinel structure of lithium manganese oxide provides hydrophilicity as well as porosity and inter-sheet voids suitable for accommodating large polyatomic aluminum anions. Similarly, graphite-graphite oxide composites were found to be suitable cathode materials for the proposed aluminum-ion chemistry, owing to the hydrophilicity and large inter-sheet voids introduced by the oxygen atoms.

One of ordinary skill would recognize that graphene also has sufficiently large inter-sheet voids, owing to the precursor graphene oxide material, which is subsequently reduced to increase conductivity and form graphene. However, graphene is inherently hydrophobic and therefore, graphene sheets need to be exposed to oxygen plasma to introduce oxygen containing species and improve hydrophilicity. Additional alternate cathode materials capable of accommodating the diffusion and storage of large aluminum-based ions, such as manganese dioxide, are being studied to evaluate on the cost, porosity and inter-sheet voids of the potential materials.

Lithium manganese oxide materials can be improved by leaching lithium atoms from the lithium manganese oxide materials through treatment with acids. When the lithium manganese oxide material is treated with a mineral acid such as nitric acid or hydrochloride acid, the lithium atoms are removed in the form of the corresponding lithium nitrates or lithium chlorides, thereby creating additional voids within the cathode structure. Suitable acids include aqueous solutions of 10%-90% nitric, hydrochloric, sulfuric, acetic, hydroiodic, or phosphoric acid. In one embodiment, lithium atoms can be removed by dispersing lithium manganese oxide in an acidic medium (30%-70% concentrated hydrochloric or nitric acids) and sonicated for 1-6 hours until a stable dispersion is obtained. If nitric acid is used the color of the lithium manganese oxide changes from black to dark red. In another embodiment, lithium atoms can be removed by stirring the suspension of dispersing lithium manganese oxide in an acidic medium at room temperature for about 0.5 to about 6 hours, typically about two hours. In other embodiments, the suspensions were stirred for various durations from 0.5 hours to 24 hours at different temperatures from room temperature to about 80° C. The resulting suspension is then filtered through a filter membrane with pore size ranging from 0.1-40 µm, preferably with a pore size greater than 0.2 µm and is repeatedly washed with deionized water or ethanol to remove trace amounts of residues, such as $LiNO_3$. Suitable filter membrane materials, such as nylon, are those that can withstand the acid used in the process. The filtrate is then dried in a vacuum furnace to obtain the resultant powder, $Li_{1-x}MnO_2$, where x denotes the amount of lithium removed by the acid treatment process. As the acid treatment approaches complete removal of lithium, x approaches 1, and the product is substantially $MnO_2$.

In certain embodiments, commercially available lithium manganese oxide is dispersed in 30% concentrated hydrochloric acid or 67% concentrated nitric acid and sonicated for six hours until a stable dispersion is obtained. Formation of a dispersion is indicated by a change in color from black to reddish brown. The resulting suspension is then filtered through a Whatman nylon membrane filter with pore size ranging from 0.2-0.45 µm and is repeatedly washed to remove trace amounts of the acid. The filtrate is then dried in a vacuum furnace at 110° C. to obtain the resultant powder, $Li_{1-x}MnO_2$.

Batteries were fabricated that used the aluminum based electrochemistry, including an aluminum anode and an aqueous solution of an aluminum salt as an electrolyte. In certain embodiments, batteries contained an aluminum anode, an acid-treated lithium manganese oxide cathode and an aqueous solution of an aluminum salt as an electrolyte in a coin cell configuration. In certain embodiments, batteries contained an aluminum anode, a graphite-graphite oxide composite cathode and an aqueous solution of an aluminum salt as an electrolyte in a coin cell configuration. In certain embodiments, batteries contained an aluminum anode, a graphene cathode and an aqueous solution of an aluminum salt as an electrolyte in a coin cell configuration. When a 1 M aqueous solution of aluminum nitrate was used as the electrolyte, the batteries having an aluminum anode and an acid-treated lithium manganese oxide cathode chemistry provided an open circuit voltage of about 1 volt. When a 1 M aqueous solution of aluminum nitrate was used as the electrolyte, the batteries having an aluminum anode and graphite-graphite oxide composite cathode provided an open circuit voltage between 600 mV and 800 mV. When a 1 M aqueous solution of aluminum nitrate was used as the electrolyte, the batteries having an aluminum anode and a graphene cathode provided an open circuit voltage between 600 mV and 800 mV. When the cells were discharged, aluminum-based ions migrated from the anode towards the cathode. Following a discharge, when the cells were charged, aluminum ions migrated to the anode.

WORKING EXAMPLES

Example 1

Alkali Metal Hydroxide Treatment of the Aluminum Anode

Battery-grade pristine aluminum foils were treated to increase hydrophilicity and improve wettability of the anode. While not wishing to be bound by theory, it is believed that a hydrophobic aluminum anode would prevent efficient ion transport due to high interfacial resistance between the aluminum metal and aqueous electrolyte interface, leading to a significant drop in performance. The hydrophilicity of the surface of the aluminum metal was increased by treatment with a lithium hydroxide aqueous solution. Lithium is known to have a strong affinity for aluminum, forming a range of lithium-aluminum based alloys, characterized by the formation of a greyish-white texture on the aluminum surface. The resulting aluminum anode is found to be significantly more hydrophilic than untreated, pristine aluminum. Aqueous solutions of other alkali metal hydroxides, such as sodium hydroxide and potassium hydroxide, are also suitable for use in this treatment.

Figure 1A:
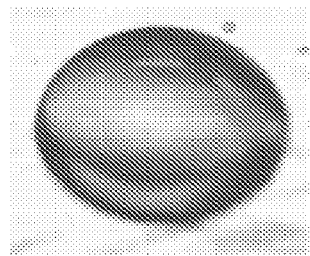
FIG. 1A is a photograph of aluminum foil suitable for use as an anode that has been treated with a drop of an aqueous solution of lithium hydroxide.
Figure 1B:
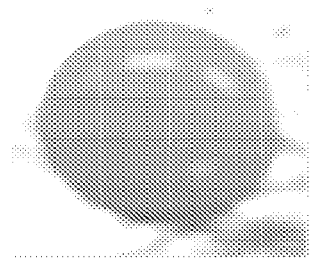
FIG. 1B is a photograph of the piece of the treated aluminum foil of FIG. 1A showing a change in the appearance of the drop of the aqueous solution of lithium hydroxide.
Figure 1C:
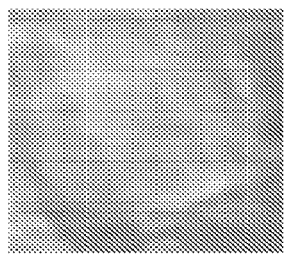
FIG. 1C is a photograph of the piece of treated aluminum foil of FIG. 1B showing the greyish-white appearance of the aluminum foil following the drying of the lithium hydroxide solution.
Figure 1D:
FIG. 1D is a photograph of the piece of treated aluminum foil of FIG. 1C showing the effect of placing a drop of deionized water on the treated aluminum foil indicating an increase in hydrophilicity of the treated aluminum foil.
Figure 1E:
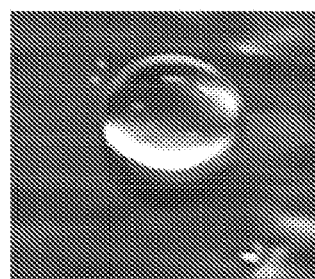
FIG. 1E is a photograph of a drop of deionized water on untreated aluminum foil for comparison to FIG. 1D.

FIG. 1A is a photograph of a piece of aluminum foil treated with a drop of 1 M aqueous solution of lithium hydroxide; FIG. 1B is a photograph of the piece of the treated aluminum foil of FIG. 1A showing a change in the appearance of the drop of the aqueous solution of lithium hydroxide. After a short time the aqueous solution of lithium hydroxide was wiped away and the surface of the aluminum foil was allowed to air dry at room temperature (25° C.). Reaction times of 5-10 seconds to 1 hour have been tested, but the reaction appears to be complete in 5-10 seconds. FIG. 1C is a photograph of the piece of treated aluminum foil of FIG. 1B showing the greyish-white appearance of the aluminum foil following the drying of the lithium hydroxide solution. FIG. 1D is a photograph of the piece of treated aluminum foil of FIG. 1C showing the effect of placing a drop of deionized water on the treated aluminum foil, indicating an increase in hydrophilicity of the treated aluminum foil. FIG. 1E is a photograph of a drop of deionized water on untreated aluminum foil for comparison to FIG. 1D. In certain embodiments, an aqueous solution of about 0.01M to about 5.5M lithium hydroxide can be used.

Other means of increasing the hydrophilicity of an aluminum metal surface, such as nitrogen and oxygen plasma and treatment using acid-based treatments, primarily rely on the introduction of hydrophilic native aluminum oxide layers on the metal surface. Acid-based treatments involve complicated chemistry, increasing manufacturing costs, and have significant environmental impacts associated with use and disposal. Plasma treatment, on the other hand, is an expensive high voltage process, and is unsuitable for large-scale manufacturing.

Example 2

Figure 2:
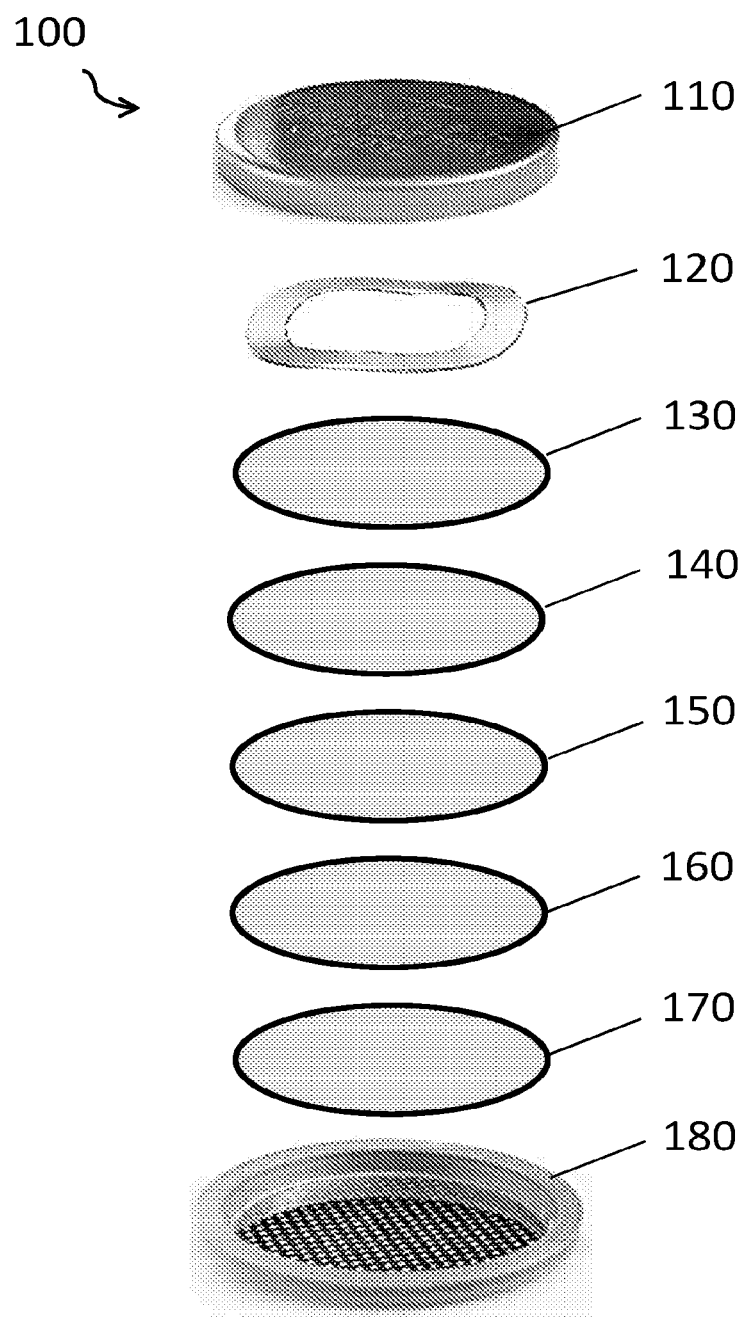
FIG. 2 is a schematic diagram of an exploded view of a test battery 100 in a coin cell format, showing the positive case 110, a spring 120, a first spacer 130, the cathode 140, the separator 150, the anode 160, a second spacer 170 and the negative case 180.

Aluminum Anode vs. Acid-Treated Lithium Manganese Oxide Cathode Battery and Aluminum Anode vs. Graphite-Graphic Oxide Cathode Battery Batteries were assembled using an aluminum anode, an acid-treated lithium manganese oxide cathode and an aqueous solution of aluminum nitrate as the electrolyte. Studies were conducted using the standard 2032 coin cell form factor, illustrated in FIG. 2. FIG. 2 is a schematic diagram of an exploded view of a test battery 100 in a coin cell format, showing the positive case 110, a spring 120, a first spacer 130, a cathode 140, a separator 150, an anode 160, a second spacer 170 and the negative case 180. Prior to assembly of the test battery 100, aliquots of the electrolyte are placed between the separator 150 and the anode 160, as well between the separator 150 and the cathode 140. Preferably, the first spacer 130, the cathode 140, the separator 150, the anode 160, and the second spacer 170 are immersed in and equilibrated with the electrolyte prior to assembly of the test battery.

A battery grade aluminum foil is used as the anode 160. Battery grade foils are generally >99% pure. The thickness of any battery-grade foil should be limited, since the thickness directly impacts the volumetric energy density at the system level, defined as: (Net Available Energy Density in Watt-hours/Total volume of the electrode, including the current collector). Thicker current collectors also reduce the maximum number of electrodes that can be stacked in a battery pack/module. Ideally, battery-grade current collectors vary between 8-30 μm in thickness. Mechanical robustness is also necessary to prevent any wear and tear during the electrode coating or cell/battery assembly process. The tensile strength of commercial battery-grade foils vary between 100-500 N/mm. Suitable battery grade aluminum foil and other materials may be obtained from MTI Corporation, Richmond, Calif. and Targray Technology International Inc., Laguna Niguel, Calif. Battery grade lithium manganese oxide cathode and graphite may be obtained from MTI Corporation, Richmond, Calif. and Sigma Aldrich, St. Louis, Mo. Graphene and graphite oxide may be purchased from Sigma Aldrich, St. Louis, Mo., Graphene Supermarket, Calverton, N.Y., and ACS Material, Medford, Mass.

Aluminum foil anodes were treated as described in Example 1 to improve their hydrophilic properties.

The charge/discharge steps were carried out in the voltage window of 0-2V. As the cell was discharged, hydroxyaluminate ($Al(OH)_4^-$) ions were formed according to chemical reaction (5):

$$Al^{3+} + 4OH^- \rightarrow Al(OH)_4^- \quad (5)$$

The hydroxyaluminate ions migrate towards the cathode, passing through the porous membrane separator.

Figure 3:
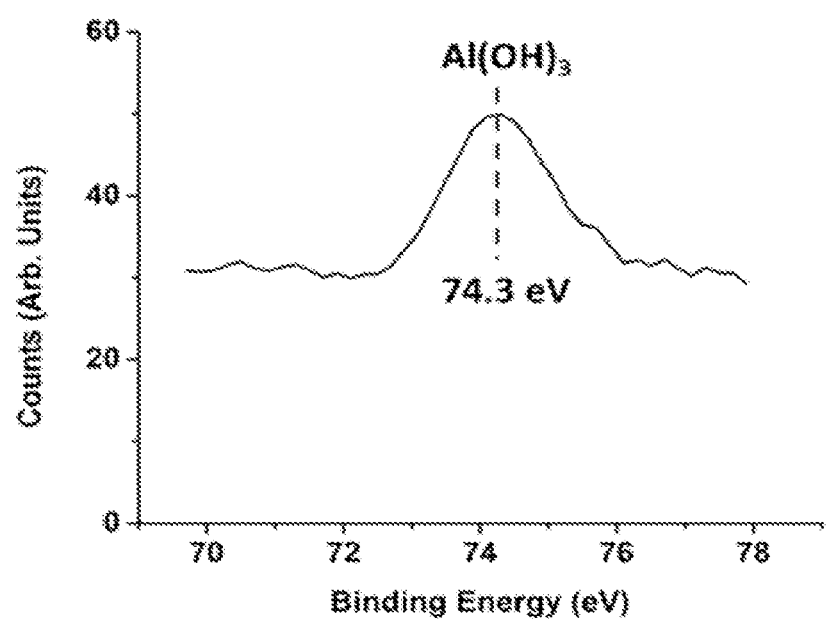
FIG. 3 is an x-ray photoelectron spectroscopy (XPS) profile of carbon sheets following a 100% depth of discharge, showing a strong peak corresponding to Al 2p transition, associated with the presence of gibbsite, $Al(OH)_3$, crystals.

At the cathode, the hydroxyaluminate ions diffuse through the pores and inter-sheet voids of the cathode material and are oxidized to give $Al(OH)_3$ (aluminum hydroxide). The presence of aluminum hydroxide on the aluminum foil anode of a completely (100%) discharged test cell has been confirmed using x-ray photoelectron spectroscopy (XPS), as shown in FIG. 3. The XPS profile shows one major Al 2p transition at 74.3 eV, indicating the presence of gibbsite, $Al(OH)_3$ on the anode. The transition at 74.3 eV has been reported to be characteristic of gibbsite by Kloprogge et al. Kloprogge, J. T., et al., XPS study of the major minerals in bauxite: gibbsite, bayerite and (pseudo-) boehmite, *Journal of Colloid and Interface Science*, 2006, 296(2), 572-576. In the reverse charging process, aluminum hydroxide is reduced at the cathode and the aluminum ions migrate back to the anode.

The discharge and charge reactions at the cathode, chemical reactions (6) and (7), respectively, are provided below:

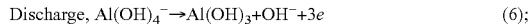

$$\text{Discharge, } Al(OH)_4^- \rightarrow Al(OH)_3 + OH^- + 3e \quad (6);$$

$$\text{Charge, } Al(OH)_3 + 3e^- \rightarrow Al^{3+} + 3OH^- \quad (7)$$

During the charging process, an additional contribution may be observed at the acid-treated lithium manganese oxide cathode through the dissociation reaction of lithium manganese oxide according to reaction (8), below:

$$LiMnO_2 + e^- \rightarrow Li^+ + MnO_2 \quad (8).$$

The lithium ions would then flow towards the aluminum anode and possibly intercalate with aluminum, owing to the high affinity between lithium and aluminum, forming a hybrid-ion battery chemistry. This hypothesis could relate to an observed increase in capacity (about 40%) compared to the capacities obtained with carbon-based cathodes devoid of any lithium component. However, XPS examination of the aluminum anode in a test cell having a lithium manganese oxide cathode did not show any significant signs of lithium-based alloys at the anode site at a fully charged state. However, this result can be attributed to the fact that the dissociation reaction of lithium manganese oxide occurs at significantly higher voltages (>3V) and in the given voltage window, the concentration of lithium ions is negligible compared to the presence of aluminum-based alloys. In addition, XPS is a surface-based analytic technique and the excellent lithium ion diffusion in aluminum might have caused the lithium ions to have diffused within the bulk aluminum anode and would therefore be absent from the surface.

Operating Parameters and Performance Metrics. The aluminum-ion cells were cycled between safe voltage cut-off limits of 0 V (discharge) and 2 V (charge). However, the average operating voltage was about 1.1 V for discharge and 1.2 V for charge for the cells having an aluminum anode and an acid-treated lithium manganese oxide cathode (FIG. 4A) and 0.4 V for discharge and 0.9 V for charge for the cells having an aluminum anode and a graphite-graphite oxide cathode (FIG. 4B), within the safe voltage cut-off limits.

Figure 4A:
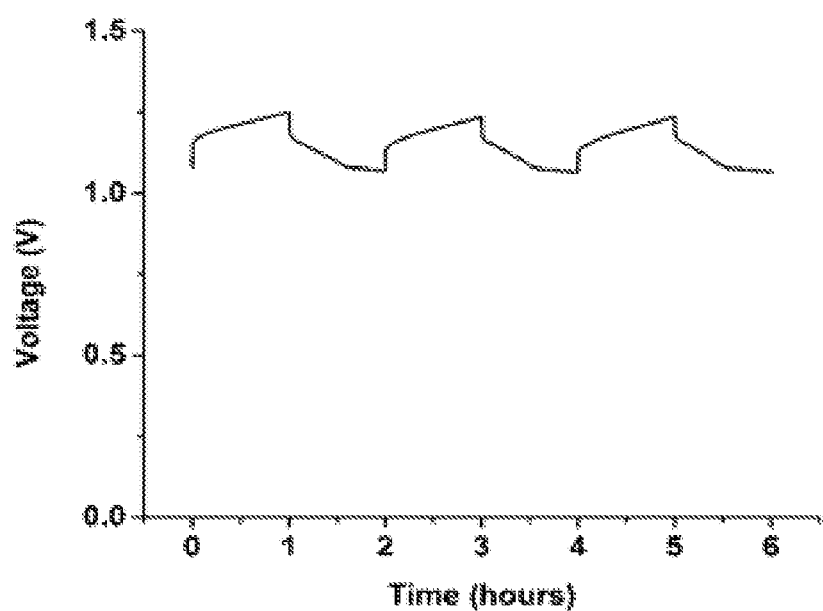
FIG. 4A shows the voltage profile that was produced by applying current at a current density of 0.1 $mA/cm^2$ to a test battery having an anode comprising an aluminum foil treated with LiOH as described in Example 1, a cathode comprising acid-treated lithium manganese oxide, a 25 μm thick polypropylene separator with an average pore size of 0.067 μm, and a 0.5 M aqueous aluminum nitrate electrolyte.
Figure 4B:
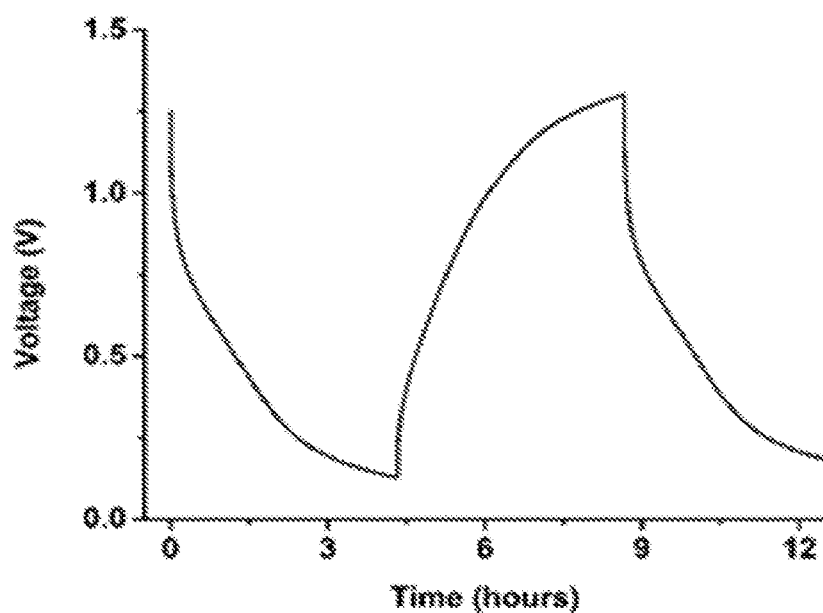
FIG. 4B shows the voltage profile that was produced by applying current at a current density of 0.1 $mA/cm^2$ to a test battery having an anode comprising an aluminum foil treated with LiOH as described in Example 1, a cathode comprising graphite-graphite oxide, a 25 μm thick polypropylene separator with an average pore size of 0.067 μm, and a 0.5 M aqueous aluminum nitrate electrolyte. The observed average operating voltage is significantly higher with the use of acid-treated lithium manganese oxide cathodes, possibly owing to the higher activation energy for diffusion and intercalation of ions. Carbon is known to possess a sufficiently low activation energy for diffusion and intercalation of metal ions (the intercalation voltage of lithium ions in carbon against a lithium metal occurs at about 100 mV).

FIG. 4A shows the voltage profile that was produced by applying current at a current density of 0.1 mA/cm² to a test battery having an anode comprising an aluminum foil treated with LiOH as described in Example 1, a cathode comprising acid-treated lithium manganese oxide, a 25 μm thick polypropylene separator with an average pore size of 0.067 μm, and a 0.5 M aqueous aluminum nitrate electrolyte. FIG. 4B shows the voltage profile that was produced by applying current at a current density of 0.1 mA/cm² to a test battery having an anode comprising an aluminum foil treated with LiOH as described in Example 1, a cathode comprising graphite-graphite oxide, a 25 μm thick polypropylene separator with an average pore size of 0.067 μm, and a 0.5 M aqueous aluminum nitrate electrolyte. The observed average operating voltage is significantly higher with the use of acid-treated lithium manganese oxide cathodes, possibly owing to the higher activation energy for diffusion and intercalation of ions. Carbon is known to possess a sufficiently low activation energy for diffusion and intercalation of metal ions (the intercalation voltage of lithium ions in carbon against a lithium metal occurs at about 100 mV).

Figure 5A:
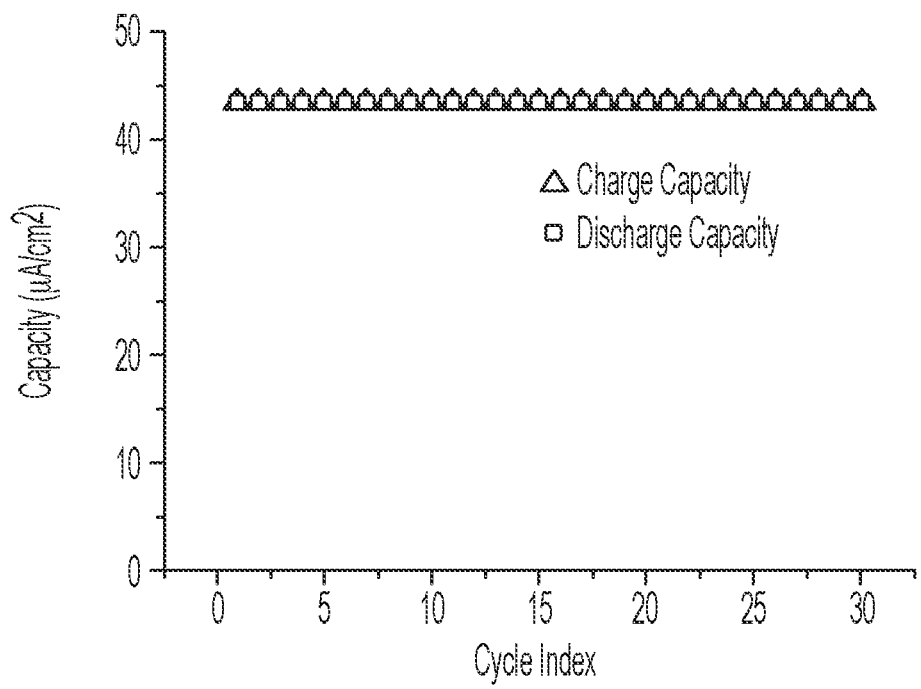
FIG. 5A shows the battery capacity as a function of cycle index of a battery having an anode comprising an aluminum foil treated with LiOH as described in Example 1, a 25 μm thick polypropylene separator with an average pore size of 0.067 μm, and a 0.5 M aqueous aluminum nitrate electrolyte and a graphite-graphite oxide composite cathode. The coulombic efficiency was estimated to be close to 100%, indicating efficient and reversible charge and discharge kinetics.

Moreover, the voltage profile demonstrates a characteristic voltage plateau (FIG. 4A), unlike the voltage profiles observed in sodium ion batteries, enabling critical advantages such as incorporation of simpler battery management systems and installation of fewer cells in series owing to the high operating voltages, all of which can significantly drive down the cost of the technology. The charge/discharge rates were limited between C/1 and C/12 (a rate of C/n implies charge or discharge in n hours). While cycle life testing is currently underway, both the graphite-based and acid-treated lithium manganese oxide-based configurations have so far demonstrated impressive cycle life, delivering close to about 100% coulombic efficiency (defined as the ratio of charge to discharge capacities and is indicative of irreversibility and side-reactions in a battery chemistry). FIG. 5A shows the battery charge capacity, open triangles, and discharge capacity, open circles, as a function of the cycle index of a battery having an anode comprising an aluminum foil treated with LiOH as described in Example 1, a 25 μm thick polypropylene separator with an average pore size of 0.067 μm, and a 0.5 M aqueous aluminum nitrate electrolyte and a graphite-graphite oxide composite cathode. The coulombic efficiency was estimated to be close to 100% over 30 charge/discharge cycles, indicating efficient and reversible charge and discharge kinetics.

Figure 5B:
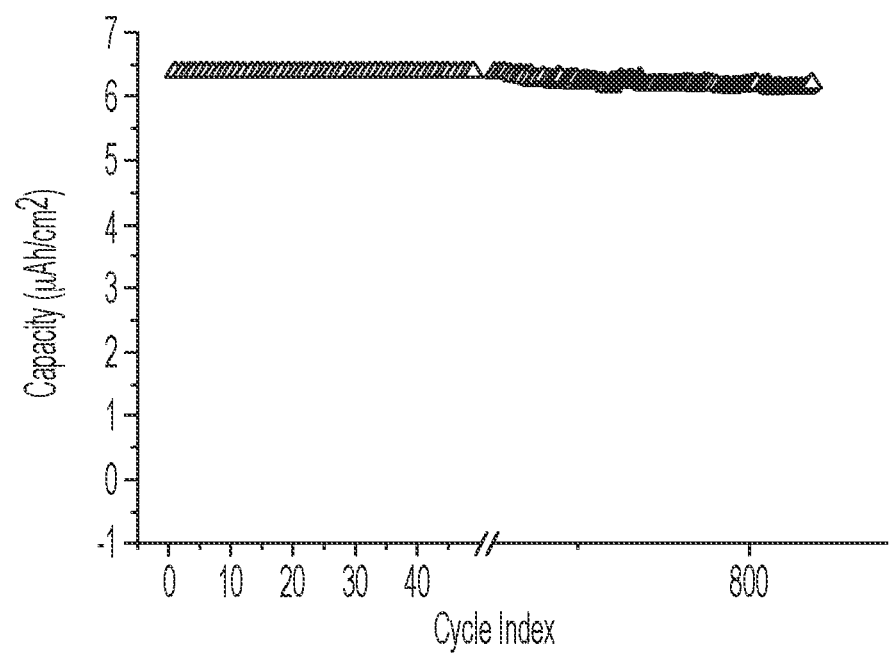
FIG. 5B shows the battery capacity as a function of cycle index of a battery having an anode comprising an aluminum foil treated with LiOH as described in Example 1, a 25 μm thick polypropylene separator with an average pore size of 0.067 μm, and a 0.5 M aqueous aluminum nitrate electrolyte and an acid-treated $Li_{1-x}MnO_2$ cathode. The reduction in capacity after over 800 charge/discharge cycles is only about 3% of the original capacity.

FIG. 5B shows the battery charge capacity as a function of cycle index of a battery having an anode comprising an aluminum foil treated with LiOH as described in Example 1, a 25 μm thick polypropylene separator with an average pore size of 0.067 μm, and a 0.5 M aqueous aluminum nitrate electrolyte and an acid-treated $Li_{1-x}MnO_2$ cathode. The reduction in capacity after over 800 charge/discharge cycles is about 3% of the original capacity.

Understandably, the acid-treated lithium manganese oxide-aluminum chemistry with an aqueous electrolyte provides higher energy density (about 100-150 Wh/kg) and volumetric energy density (about 30-60 Wh/L) than the graphite-graphite oxide-aluminum chemistry (about 50-75 Wh/kg and about 20-30 Wh/L), normalized by the mass and volume of cathode, owing to the higher electrochemical affinity towards aluminum observed in acid-treated lithium manganese oxide. However, graphite-graphite oxide cathodes are generally cheaper than lithium manganese oxide. Further modifications to the cathode chemistry may significantly boost the performance metrics of graphite-graphite oxide cathodes.

Figure 6A:
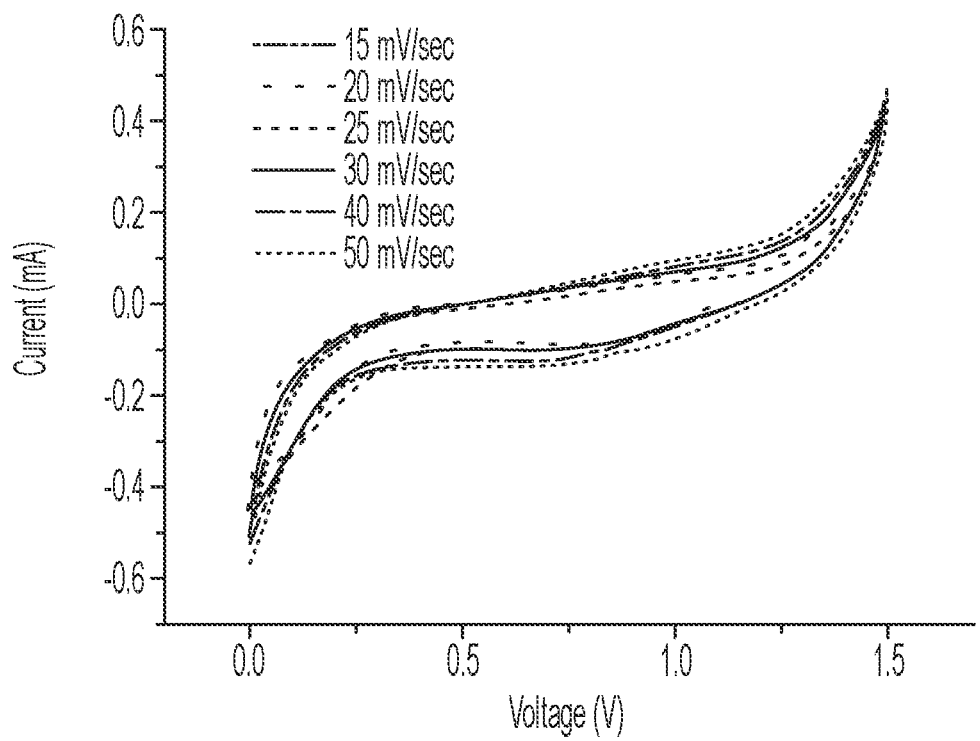
FIG. 6A shows sequential cyclic voltammetry profiles of a battery having an anode comprising an aluminum foil treated with LiOH as described in Example 1, a 25 μm thick polypropylene separator with an average pore size of 0.067 μm, and a 0.5 M aqueous aluminum nitrate electrolyte and an acid-treated lithium manganese oxide cathode.
Figure 6B:
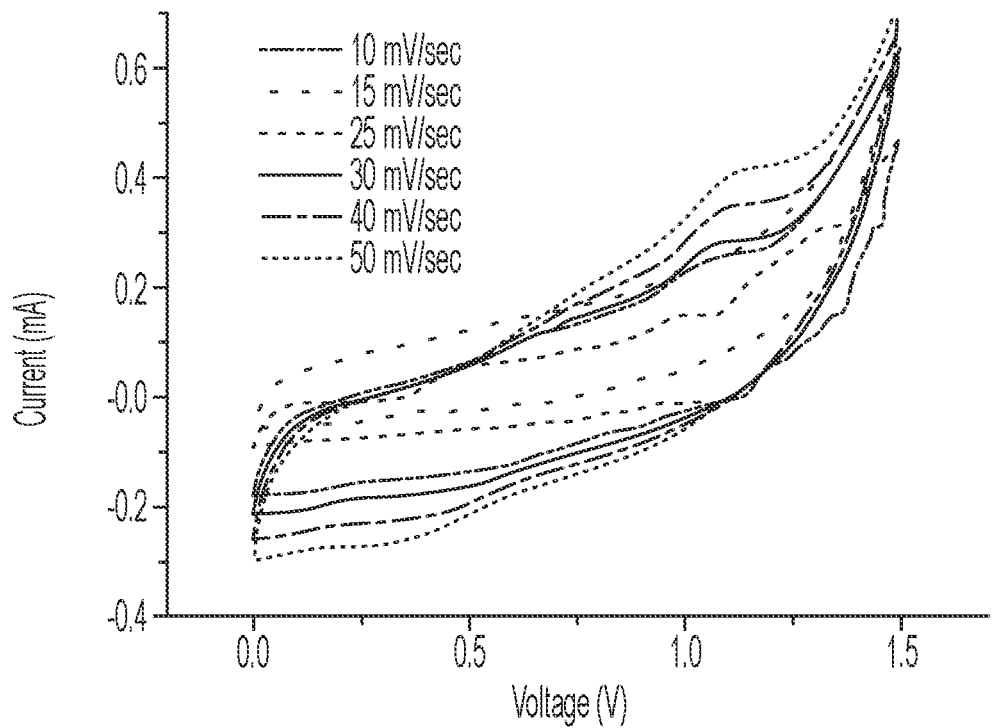
FIG. 6B shows sequential cyclic voltammetry profiles of a battery having an anode comprising an aluminum foil treated with LiOH as described in Example 1, a 25 μm thick polypropylene separator with an average pore size of 0.067 μm, and a 0.5 M aqueous aluminum nitrate electrolyte and a graphite-graphite oxide cathode. The test batteries in the coin cell format were cycled at various voltage sweep rates between 10 mV/sec and 50 mV/sec within a voltage range of 0 V and 1.5 V.

Sequential cyclic voltammetry tests were carried out to measure the ion diffusion coefficient in batteries having an anode comprising an aluminum foil treated with LiOH as described in Example 1, a 25 μm thick polypropylene separator with an average pore size of 0.067 μm, and a 0.5 M aqueous aluminum nitrate electrolyte and an acid-treated lithium manganese oxide cathode (FIG. 6A) or batteries having an anode comprising an aluminum foil treated with LiOH as described in Example 1, a 25 μm thick polypropylene separator with an average pore size of 0.067 μm, and a 0.5 M aqueous aluminum nitrate electrolyte and graphite-graphite oxide composite cathode (FIG. 6B). The test batteries in the coin cell format were cycled at various voltage sweep rates between 10 mV/sec and 50 mV/sec within a voltage range of 0 V and 1.5 V.

The diffusion coefficient was calculated using Fick's law following equation (I):

$$\frac{\partial C}{\partial t} = D \frac{\partial^2 C}{\partial r^2} + \frac{2D}{r} \cdot \frac{\partial C}{\partial r}. \tag{I}$$

The response of current can then be obtained as:

$$i = \frac{nFADC}{R_0} + \frac{nFAD^{1/2}C}{\pi^{1/2}t^{1/2}}. \tag{II}$$

Where n is the number of electrons exchanged, F is Faraday's constant, A is the area of the electrode, D is the diffusion coefficient, C is the molar concentration, t is time for diffusion and $R_0$ is the radius of the cathode particles.

The current response can be simplified and re-written as:

$$i = kt^{1/2} + b \tag{III}$$

where $$b = \frac{nFADC}{R_0} \tag{IV, V}$$

$$k = \frac{nFAD^{1/2}C}{\pi^{1/2}},$$

$$\text{or, } D = \frac{b^2 R_0^2}{\pi k^2}. \tag{VI}$$

Subsequently, the diffusion coefficient of hydroxyaluminate ions in acid-treated lithium manganese oxide and graphite-graphite oxide composite cathodes was calculated to be $1.14 \times 10^{-7}$ cm$^2$/sec and $3.54 \times 10^{-8}$ cm$^2$/sec respectively, well within the acceptable range of ion diffusion coefficients in metal-ion batteries.

Figure 7A:
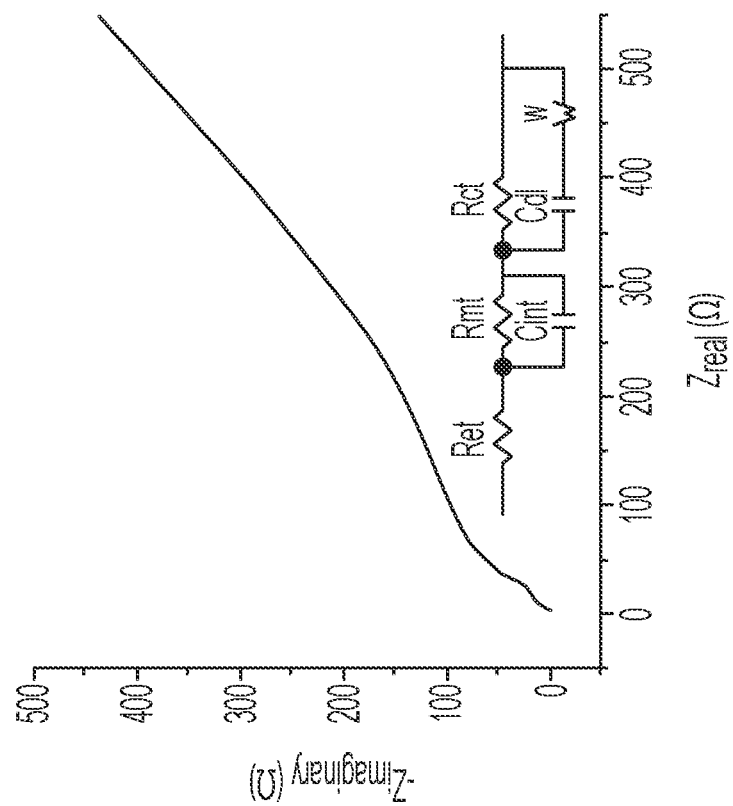
FIG. 7A shows the results of electrochemical impedance spectroscopy (EIS) of a test cell having an aluminum anode and an acid-treated lithium manganese oxide cathode.
Figure 7B:
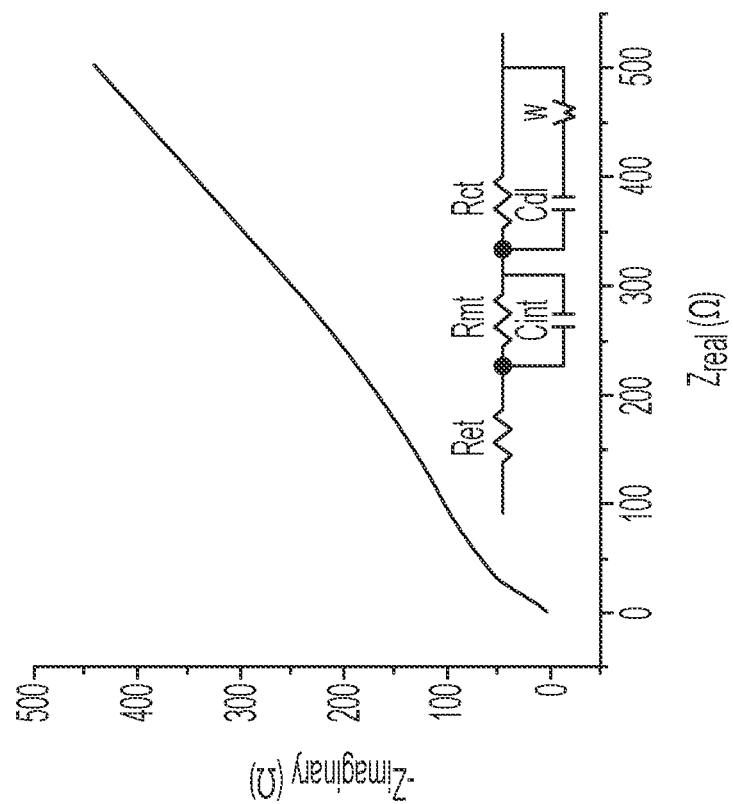
FIG. 7B shows the results of electrochemical impedance spectroscopy (EIS) of a test cell having an aluminum anode and a graphite-graphite oxide cathode. Insets show the Randles equivalent circuit used to fit the spectra.

In addition, electrochemical impedance spectroscopy (EIS) was carried out to analyze the internal resistances of batteries having an anode comprising an aluminum foil treated with LiOH as described in Example 1, a 25 μm thick polypropylene separator with an average pore size of 0.067 μm, and a 0.5 M aqueous aluminum nitrate electrolyte and an acid-treated lithium manganese oxide cathode (FIG. 7A) and batteries having an anode comprising an aluminum foil treated with LiOH as described in Example 1, a 25 μm thick polypropylene separator with an average pore size of 0.067 μm, and a 0.5 M aqueous aluminum nitrate electrolyte and a graphite-graphite oxide cathode (FIG. 7B). Insets show the Randles equivalent circuit used to fit the spectra.

Since the operating voltages are close to the electrolysis voltage of the aqueous electrolyte system, analyzing EIS is critical to understand potential safety threats associated with gas evolution inside the cell. It is understood that the evolution and presence of gas pockets ($H_2$ and $O_2$) within the electrolyte will directly increase the electrolytic resistance while the evolution of these gases at the electrode-electrolyte interface will increase the interfacial resistance.

The EIS profile was fitted with a Randles equivalent circuit model and the electrolytic resistance, interfacial resistance and charge transfer resistances, summarized in Table 2, below, were estimated based on the fit. The electrolytic resistances were estimated to be between 2-4Ω, significantly lower than the typical electrolytic resistances of 10-20Ω, consistent with the absence of any gas pockets within the electrolyte. The interfacial resistance was estimated to be 11Ω at the acid-treated lithium manganese oxide-electrolyte interface and 20Ω at the graphite-graphite oxide-electrolyte interface, again consistent with the absence of any insulating gas pockets. The charge transfer resistance of acid-treated lithium manganese oxide was estimated to be about 100Ω while that of graphite-graphite oxide composite was estimated to be slightly higher at about 131Ω, possibly attributed to the presence of oxygen-containing functional groups. Charge transfer resistance is indicative of the electron conductivity of the active electrode material and is independent of the formation of gas pockets. One of ordinary skill would recognize that a charge-transfer resistance of 100-150Ω is generally considered to be suitable for battery storage applications.

TABLE 2

EIS Profile Results

| Parameter | Acid-Treated Lithium Manganese Oxide Cathode | Graphite-Graphite Oxide Cathode |
|---|---|---|
| Rel | 2-4 Ω | 2-4 Ω |
| Rint | 11 Ω | 20 Ω |
| Ret | about 100 Ω | about 131 Ω |

Figure 8A:
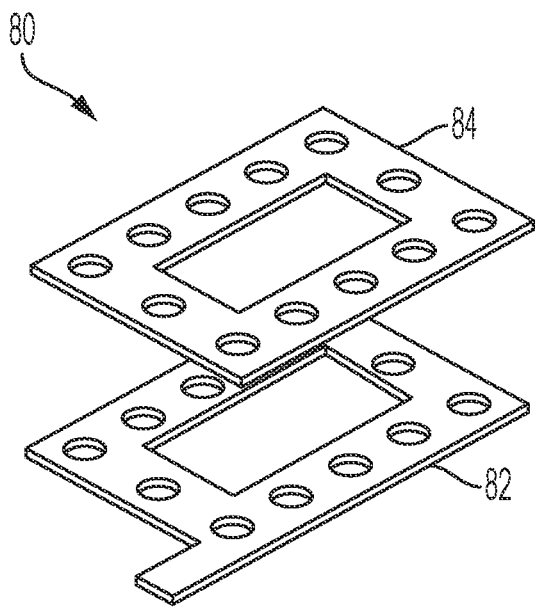
FIG. 8A is a schematic representation of a prismatic cell 80.

In order to assess form factor scalability of the aluminum ion battery chemistry, pouch cell and prismatic cells were also assembled and tested. A schematic depiction of the prismatic cell assembly is provided in FIG. 8A. The prismatic assembly 80 comprised a metallic or a polymer base plate 82 an insulating polymer gasket 84 and a top plate resembling the structure of the base plate, not shown for clarity. The components had threaded through-holes along its edges. For metallic base and top plates, nylon screws were used to seal the assembly while simultaneously preventing a shorting between the two plates while for polymer base and top plates, both nylon and metallic screws sufficed. A prismatic cell was assembled with an electrode area of 2 cm×5 cm and rated at a capacity of 1 mAh. Standard polypropylene separators were used in the assembly. The cell comprised a single interface, although multiple interfaces can also be incorporated with the setup.

Figure 8B:
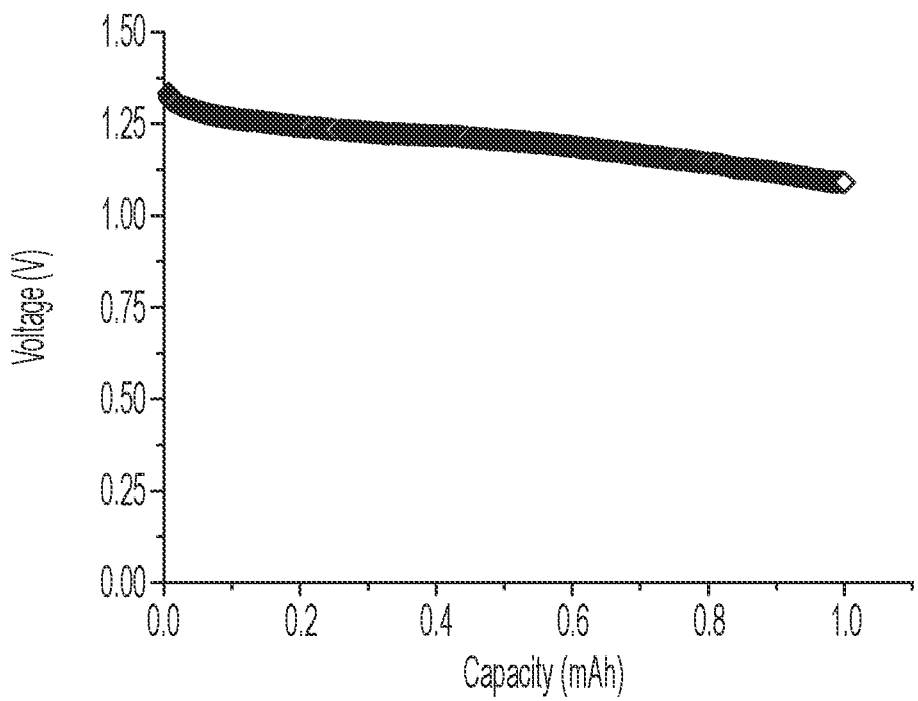
FIG. 8B illustrates the discharge voltage profile of a prismatic cell rated at 1 mAh. The cell had an anode comprising an aluminum foil treated with LiOH as described in Example 1, a cathode comprising acid-treated lithium manganese oxide, a 25 μm thick polypropylene separator with an average pore size of 0.067 μm, a 0.5 M aqueous aluminum nitrate electrolyte and were tested at 10 $μA/cm^2$.

FIG. 8B illustrates the discharge voltage profile of a prismatic cell rated at 1 mAh. The cell had an anode comprising an aluminum foil treated with LiOH as described in Example 1, a cathode comprising acid-treated lithium manganese oxide, a 25 μm thick polypropylene separator with an average pore size of 0.067 μm, a 0.5 M aqueous aluminum nitrate electrolyte and were tested at 10 μA/cm².

Figure 9A:
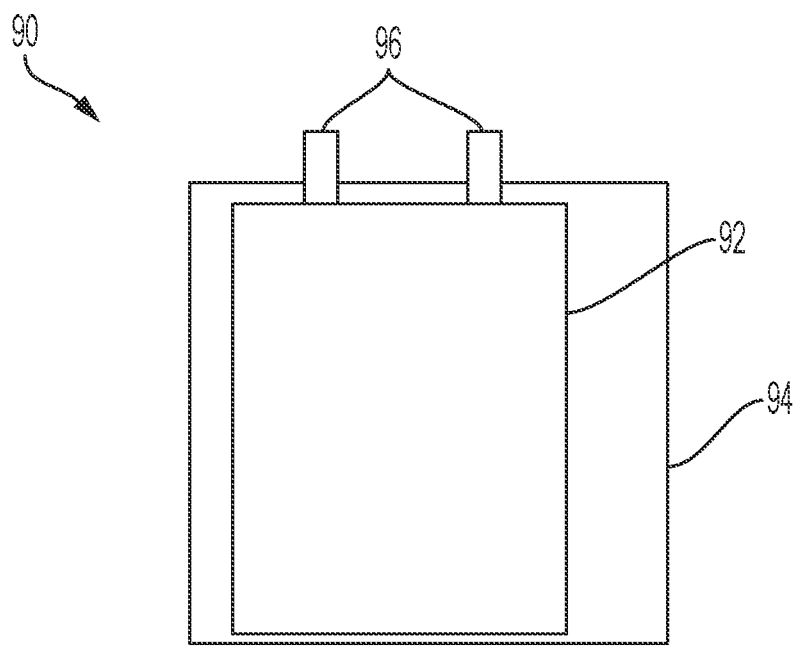
FIG. 9A is a schematic representation of a pouch cell 90.

Pouch cells were assembled by introducing the anode-separator-cathode interface in the cell assembly section of an aluminum laminate pouch cell packaging case. This was followed by connecting the electrodes to an aluminum current collector tab through mechanical contacts or ultrasonic welding. Next, three edges of the pouch cell were sealed using a heat sealer set between about 20-50 psi and 150-180° C. A section of the pouch cell was retained at one of the edges that acted as the gas trap. The purpose of the gas trap is to contain the gas evolution during the formation cycle, after which the gas trap section can be cut and the edge resealed for subsequent cycling. Prior to sealing the fourth and final edge of the pouch cell, the electrodes-separator assembly was wetted with the electrolyte. The fourth edge is sealed in a vacuum sealing furnace with the vacuum set at about −90 psi. The pressure and temperature parameters are unchanged and are set between 20-50 psi and 150-180° C. respectively. A schematic diagram of a pouch cell 90 is provided in FIG. 9A, showing a cell assembly section 92, a gas trap 94 and current collector terminals 96. A pouch cell assembled in this fashion involved electrodes between 1 cm×0.8 cm and 1 cm×1 cm, rated between 0.06-0.08 mAh.

Figure 9B:
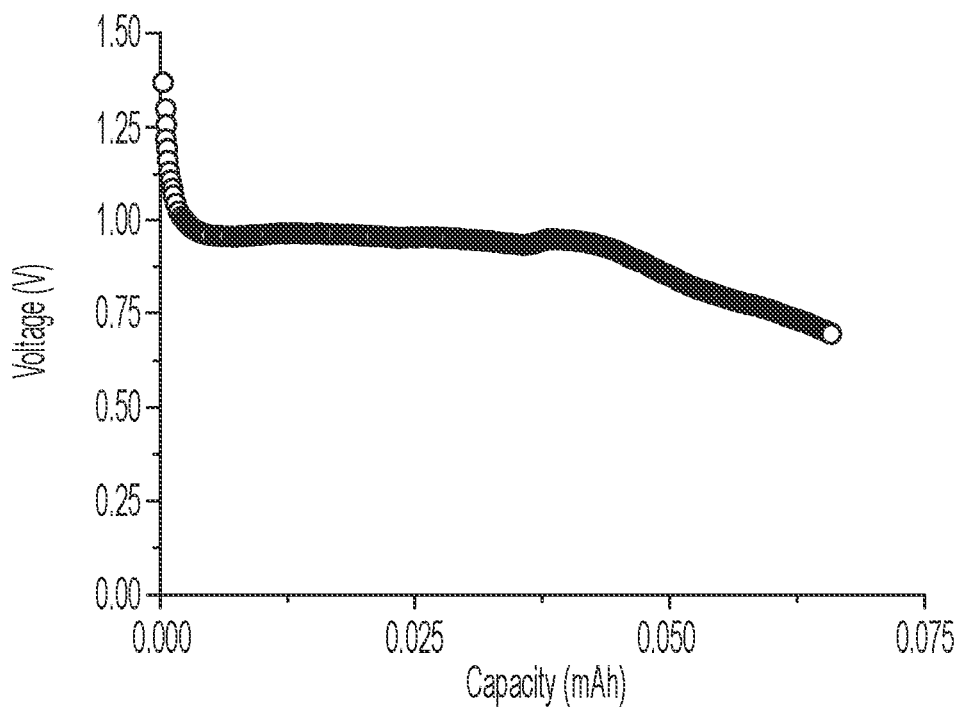
FIG. 9B illustrates the discharge profile of a pouch cell comprising 0.8 cm×1 cm electrodes and hydrophilic polypropylene separators. The cell had an anode comprising an aluminum foil treated with LiOH as described in Example 1, a cathode comprising acid-treated lithium manganese oxide, a 25 μm thick polypropylene separator with an average pore size of 0.067 μm, a 0.5 M aqueous aluminum nitrate electrolyte and were tested at about 25 $μA/cm^2$.

FIG. 9B illustrates the discharge profile of a pouch cell comprising 0.8 cm×1 cm electrodes and hydrophilic polypropylene separators. The cell had an anode comprising an aluminum foil treated with LiOH as described in Example 1, a cathode comprising acid-treated lithium manganese oxide, a 25 μm thick polypropylene separator with an average pore size of 0.067 μm, a 0.5 M aqueous aluminum nitrate electrolyte and were tested at about 25 μA/cm². Like the prismatic cell format, a pouch cell assembled in this fashion can also incorporate scalability and multiple interfaces can be packed in series/parallel configurations to achieve a pre-determined capacity and voltage rating.

The need to find an alternate energy storage system to meet the ever-increasing demands from various sectors such as consumer electronics, military, automotive and grid storage have continued to rise exponentially in the last decade. While lithium ion batteries are ubiquitous today in consumer electronics, its limitations with respect to high costs and potentially hazardous safety threats have limited its entry in emerging fields such as grid storage, and automotive applications. Sodium ion batteries on the other hand may offer a marginal reduction in the cost at the system level but are significantly limited in performance metrics in terms of available capacities and energy density, voltage window and the choice of electrolytes. Alternate upcoming technologies such as flow batteries and liquid metal batteries are still in early stages of development. Moreover, such technologies pose additional challenges in terms of cost of implementation and safety. For instance, the availability of unlimited capacity in vanadium redox flow batteries rely on large storage tanks and industrial pumps that add to the cost and maintenance of the battery system. Liquid metal batteries operate at very high temperatures and incorporate the use of toxic materials such as antimony and lead as well as flammable lithium metal, thereby posing serious safety concerns.

Also disclosed are systems and methods of using the disclosed rechargeable battery. FIG. 8 is a block diagram of an embodiment of a system 800 that incorporates the battery 810 of the present disclosure, showing a controller 820 that is operatively connected to battery 810, a source of electrical power 830, a local electrical load 840 and an electrical power distribution grid 850. In certain embodiments, the source of electrical power 830 is based on a renewable energy source, that is, a wind turbine or a solar panel. The controller 820 is operatively connected to the source of electrical power 830 and to the battery 810 of the present disclosure to mediate the charging of the battery 810. The controller 820 is operatively connected to the source of one or more local electrical loads 840 and to the battery 810 of the present disclosure to mediate the discharging of the battery 810. The local electrical loads 840 can include devices requiring DC electrical supply or AC electrical supply, including, without limitation, cell phone or computer battery chargers, computers, home appliances, water pumps, and refrigeration equipment. In certain embodiments, the controller 820 is operatively connected to a power distribution grid 850 to permit selling excess electrical power to the power distribution grid 850.

Example 3

Electrolyte Additives

In some examples, the electrolyte, 0.5 M Al(NO$_3$)$_3$, was mixed with 10-50 vol. % 2 M LiOH to obtain a composite electrolyte. While not wishing to be bound by theory, it is believed that addition of LiOH to the electrolyte comprising aluminum ions increases the concentration of OH$^{-1}$ in the electrolyte, and therefore prevents loss of active ions during transportation through undesired side reactions. Owing to the reactivity of aluminum in water, it is not uncommon to observe oxidation of Al(OH)$_4^{1-}$ ions prior to reaction at the cathode site.

The oxidation reaction can be summarized as:

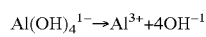

(9).

Depending on the concentration of $OH^{-1}$ ions in the electrolyte, there can be a reduction of active hydroxyaluminate ions reaching the cathode, through a dissociation reaction that subsequently leads to the oxidation of hydroxyaluminate and re-formation of multivalent aluminum ions. Increasing the concentration of $OH^{-1}$ ions through incorporation of 2 M LiOH in the electrolyte would shift the equilibration of the reaction to favor $Al(OH)_4^{1-}$ ions over the dissociation to $Al^{3+}+4OH^{-1}$.

Figure 11:
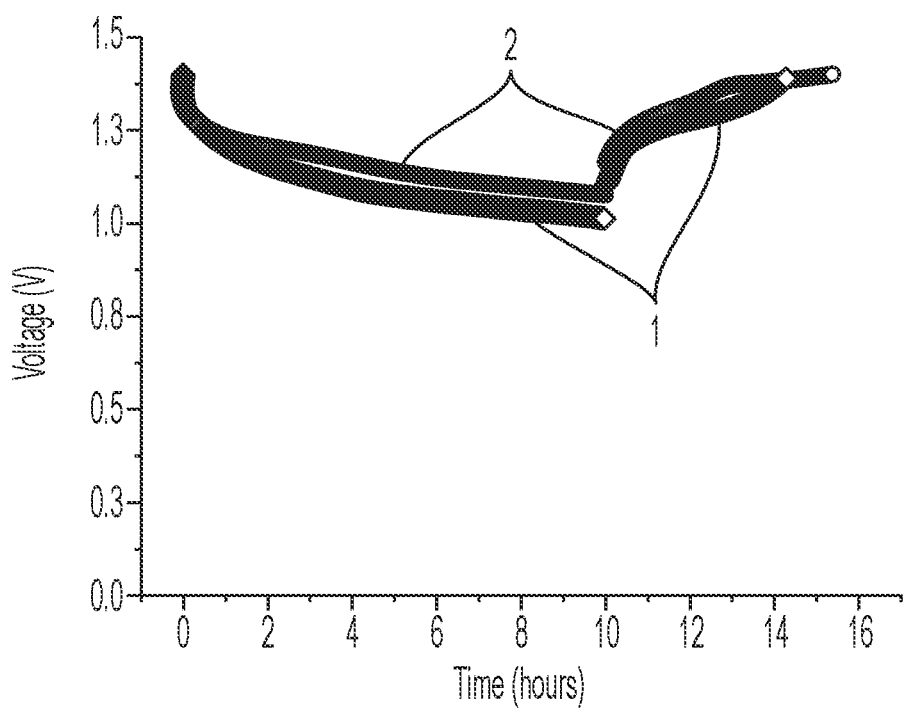
FIG. 11 compares the discharge and charging properties of two batteries differing in electrolyte composition: one battery having a 0.5 M $Al(NO_3)_3$ (aq) electrolyte (curve 1) and another battery having a 0.5 M $Al(NO_3)_3$ and 2 M LiOH (aq) electrolyte (curve 2). Each battery was assembled in a 2032 coin cell format and had an anode comprising an aluminum foil treated with LiOH as described in Example 1, a cathode comprising acid-treated lithium manganese oxide, a 25 pin thick polypropylene separator with an average pore size of 0.067 μm, and was tested at current densities of 10 $μA/cm^2$.

FIG. 11 compares the discharge and charging properties of two batteries differing in electrolyte composition: one battery having a 0.5 M $Al(NO_3)_3$ (aq) electrolyte (curve 1) and another battery having a 0.5 M $Al(NO_3)_3$ and 2 M LiOH (aq) electrolyte (curve 2). Each battery was assembled in a 2032 coin cell format and had an anode comprising an aluminum foil treated with LiOH as described in Example 1, a cathode comprising acid-treated lithium manganese oxide, a 25 µm thick polypropylene separator with an average pore size of 0.067 µm, and was tested at current densities of 10 µA/cm². In certain embodiments, the electrolyte is an aqueous solution of aluminum nitrate and lithium hydroxide in a molar ratio of about 1:1 to about 1:10.

The results illustrated in FIG. 11 suggest that incorporation of a composite electrolyte can result in a reduced over-potential. Incorporation of LiOH in the electrolyte reduces the over-potential by preventing loss of active Al-ion species during transportation in the electrolyte. The over-potential relates to the discharge voltage hysteresis caused by the cell composition. The voltage hysteresis during discharge is defined as the change from the expected operating voltage attributed to internal cell resistances and is conveyed through the equation $\Delta V=IR$ (where, $\Delta V$ is the change in voltage, I is the current and R is the internal resistance). The new operating voltage, $V_{op}'$, is then defined as $V_{op}'=V_{op}-\Delta V$. In FIG. 11, curve 1, in which the electrolyte is 0.5 M (aq) $Al(NO_3)_3$ with no LiOH additive, the higher internal resistances cause an increase in the $\Delta V$ value (which is known as the over-potential), causing it to discharge at a lower voltage. In contrast, the battery having an electrolyte that is 0.5 M $Al(NO_3)_3$ and 2 M LiOH aqueous solution (curve 2) has a reduced internal cell resistance, therefore causing the $\Delta V$ value to be less than that of the battery of curve 1, resulting in a higher discharge potential (which implies higher energy density, since energy density=capacity×operating voltage)

While the example describes a LiOH—$Al(NO_3)_3$ composite electrolyte, other hydroxide-containing compounds may also be introduced into the electrolyte to achieve similar effects. Some alternate electrolytic additives include hydroxides of sodium, potassium, ammonium, calcium and magnesium. Since the alkali metal ion (Li+, Na+ or K+ for example) is present only in the electrolyte and has a polarity opposite to $Al(OH)_4^{1-}$ ions, it will not contribute to discharge capacities.

Example 4

Separators

The aluminum ion chemistry disclosed herein involves the transport of large $Al(OH)_4^{1-}$ ions. Therefore, the pore size of the separator can dictate the ion transportation kinetics. Standard batteries such as lithium ion batteries generally use a polypropylene separator with pore sizes less than 0.1 µm, which is sufficient to permit the flow of the relatively smaller lithium ions. However, as the size of the ions increase, as is the case with $Al(OH)_4^{1-}$, small pore sizes hinder the efficient flow of ions, resulting in an increased internal cell resistance and lower charging rate and discharging rate. Therefore, in an effort to reduce accumulation of charge and resistance build-up at the separator surface, batteries having separators with larger pore diameters were studied.

The separators that were tested included polypropylene separators (standard, 0.067 µm pore size; Celgard LLC, Charlotte, N.C.), mixed cellulose ester separators (0.2 µm pore size, Whatman), nylon separators (0.45 µm, 0.8 µm, 1.2 µm pore sizes, Whatman), and glass microfiber separators (1 µm pore size, Whatman). In general, larger pore sizes, including 0.8 µm and 1.2 µm, permitted faster ion-transfer kinetics and better rate capabilities compared to the smaller pore sizes. However as the pore sizes were further increased, it appeared that there was an increase in shorting of the anode and cathode that was noticeable at a pore diameter of 2.7 µm.

Figure 12:
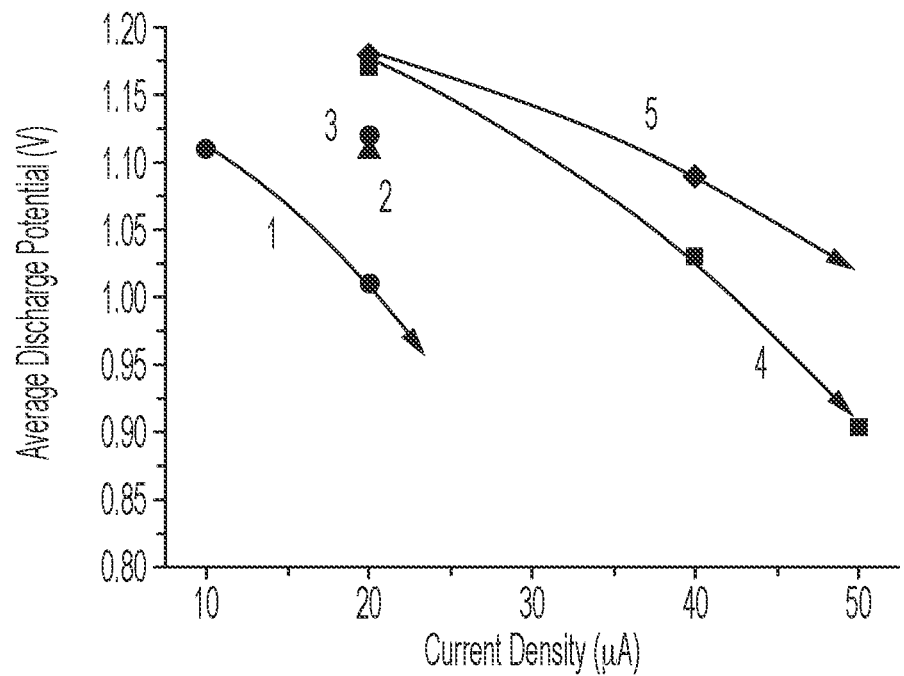
FIG. 12 illustrates the effect of separator pore size on the average discharge potential produced at a given current density, where pentagons (1) represent measurements made on a battery having a polypropylene separator with 0.067 μm pores, a triangle (2) represents measurements made on a battery having a mixed cellulose ester separator with 0.20 μm pores, a circle (3) represents measurements made on a battery having a nylon separator with 0.45 μm pores, squares (4) represent measurements made on a battery having a nylon separator with 0.80 μm pores, and diamonds (5) represent measurements made on a battery having a glass microfiber separator with 1.0 μm pores. Each battery was assembled in a 2032 coin cell format and had an anode comprising an aluminum foil treated with LiOH as described in Example 1, a cathode comprising acid-treated lithium manganese oxide, and the electrolyte was an 0.5 M aqueous aluminum nitrate solution. Polypropylene separators (pentagons) were tested at 10 $μA/cm^2$ and 20 $μA/cm^2$; mixed cellulose ester separators (triangle) and nylon separators (circle) were tested at 20 $μA/cm^2$; nylon separators (squares)

FIG. 12 illustrates the effect of separator pore size on the average discharge potential produced at a given current density, where pentagons (1) represent measurements made on a battery having a polypropylene separator with 0.067 µm pores, a triangle (2) represents measurements made on a battery having a mixed cellulose ester separator with 0.20 µm pores, a circle (3) represents measurements made on a battery having a nylon separator with 0.45 µm pores, squares (4) represent measurements made on a battery having a nylon separator with 0.80 µm pores, and diamonds (5) represent measurements made on a battery having a glass microfiber separator with 1.0 µm pores. Each battery was assembled in a 2032 coin cell format and had an anode comprising an aluminum foil treated with LiOH as described in Example 1, a cathode comprising acid-treated lithium manganese oxide, and the electrolyte was an 0.5 M aqueous aluminum nitrate solution. Polypropylene separators (pentagons) were tested at 10 µA/cm² and 20 µA/cm²; mixed cellulose ester separators (triangle) and nylon separators (circle) were tested at 20 µA/cm²; nylon separators (squares) were tested at 20 µA/cm², 40 µA/cm² and 50 µA/cm²; and glass microfiber separators (diamonds) were tested at 20 µA/cm² and 40 µA/cm².

The pore size of the separators can also influence suitability of a battery for an intended application. Understandably, separators with larger pore sizes are also thicker than those with smaller pore sizes. Therefore, while the range of optimum pore sizes is rather large, a specific choice can be made based on the intended application. For example, smaller pore sizes (example, polypropylene, 0.067 µm pore diameter and 25 µm thick) can optimize energy density (volumetric and gravimetric) while larger pore sizes (example, glass microfiber, 1 µm pore diameter and 500 µm thick) can optimize rate capability and hence, improve the power density of such batteries.

FIG. 13 illustrates the discharge of a battery having a polypropylene separator with 0.067 µm pores at a current density of 10 pA/cm². The battery was assembled in a 2032 coin cell format and had an anode comprising an aluminum foil treated with LiOH as described in Example 1, a cathode comprising acid-treated lithium manganese oxide, and the electrolyte was an 0.5 M aqueous aluminum nitrate solution.

FIG. 14 illustrates the discharge of a battery having a nylon separator with 0.80 µm pores at current densities of 20 pA/cm² (curve 1), 40 pA/cm² (curve 2), and 40 pA/cm² (curve 3). The battery was assembled in a 2032 coin cell format and had an anode comprising an aluminum foil treated with LiOH as described in Example 1, a cathode comprising acid-treated lithium manganese oxide, and the electrolyte was an 0.5 M aqueous aluminum nitrate solution.

FIG. 15 illustrates the discharge of a battery having a glass microfiber separator with 1.0 μm pores at a current densities of 20 pA/cm$^2$ (curve 1) and 40 pA/cm$^2$ (curve 2). The battery was assembled in a 2032 coin cell format and had an anode comprising an aluminum foil treated with LiOH as described in Example 1, a cathode comprising acid-treated lithium manganese oxide, and the electrolyte was an 0.5 M aqueous aluminum nitrate solution.

In addition, as a result of lowered internal resistance, separators with larger pore sizes enabled a higher voltage of operation, even at significantly higher current densities. For example, at a current density of about 20 pA/cm$^2$, a polypropylene separator (0.067 μm pore size), a nylon separator (0.8 μm pore size) and a glass microfiber separator (1 μm pore size) displayed an average discharge potential of 1.01 V, 1.17 V and 1.18 V respectively. See FIG. 12. Table 3, below, summarizes the average charge and discharge potential and the typical charge and discharge voltage hysteresis values for batteries constructed with various separators, compared against baseline (standard 0.067 μm pore size polypropylene separator tested at a current density of about 10 pA/cm$^2$).

TABLE 3

Charge & Discharge Characteristics For Specific Current Densities And Separators

| Separator | Current Density (μA/cm$^2$) | Average Discharge Voltage (V) | Discharge Hysteresis (ΔV) | Average Charge Voltage (V) | Charge Hysteresis (ΔV) |
| --- | --- | --- | --- | --- | --- |
| Polypropylene (0.067 μm) | 10 | 1.11 | 30 | 1.20 | 40 |
| Mixed cellulose ester (0.2 μm) | 20 | 1.11 | 40 | 1.26 | 50 |
| Nylon (0.45 μm) | 20 | 1.12 | 60 | 1.33 | 100 |
| Nylon (0.8 μm) | 20 | 1.17 | 53 | 1.34 | 72 |
|  | 40 | 1.03 | 99 | 1.40 | 221 |
| Glass Microfiber (1 μm) | 20 | 1.18 | 47 | 1.38 | 64 |
|  | 40 | 1.09 | 72 | 1.39 | 109 |

Table 3 shows that batteries having nylon or glass microfiber separators produced higher voltages (1.17 V-1.18 V) compared to standard polypropylene separators (1.11 V) even at twice the current density. In further studies, the discharge and charge hysteresis voltages (voltage difference between end-of-charge and start-of-discharge and end-of-discharge and start-of-charge respectively) were found to be within sufficiently acceptable values even at four-fold higher current densities (data not shown).

Other suitable separators also include, but are not limited to, polyvinylidene fluoride, polytetrafluoroethylene, cellulose acetate, nitrocellulose, polysulfone, polyether sulfone, polyacrylonitrile, polyamide, polyimide, polyethylene, and polyvinylchloride. In addition, anion exchange membranes and proton exchange membranes such as NAFION® may be used as the separator. Ceramic separators including, but not limited to, alumina, zirconia oxides and silicon oxides can also be used. As identified through the tests, the separators can have a pore size ranging between 0.067 μm and 1.2 However, separators with lower or higher porosities and thicknesses can also be used for specific applications.

Example 5

Solid Polymer Electrolytes

As an alternative to the liquid aqueous electrolyte, a solid polymer electrolyte (SPE) incorporating at least one aluminum salt with or without one or more sources of hydroxides can be used in certain embodiments. Not only does the use of SPEs allow higher operating voltages, it enables a stable reaction dynamic over a wide range of operating conditions (temperature, humidity, mechanical stresses, etc.). While the aluminum salt ensures efficient flow of aluminum ions through the electrolyte, added hydroxides contribute OH$^-$ to enable the formation of Al(OH)$_4^1$ ions during the transportation of ions. Aluminum salts include but are not limited to Al(NO$_3$)$_3$, Al$_2$(SO$_4$)$_3$ and AlCl$_3$ and combinations and variations thereof. Hydroxides include but are not limited to Al(OH)$_3$, LiOH, NaOH, KOH, Ca(OH)$_3$, Mg(OH)$_2$ and NH$_4$OH and mixtures thereof. In general, the polymer is selected from the group consisting of polytetrafluoroethylene, acetonitrile butadiene styrene, styrene butadiene rubber, ethyl vinyl acetate, poly(vinylidene fluoride-co-hexafluoropropylene), polymethyl methacrylate, and mixtures thereof.

Aluminum Salt-Based SPEs: In a certain embodiment, a cross-linking polymer such as poly(vinylidene fluoride-co-hexafluoropropylene) (PVDF-HFP) or polymethyl methacrylate (PMMA) is mixed with aluminum nitrate in a ratio ranging between 1:1 and 1:10. The mixture is then dissolved in a solvent such as N-methyl pyrrolidone or dimethyl sulfoxide and heated at temperatures ranging from 50-200° C. under constant stirring for 2 hours in order to initiate the polymerization reaction. The solution is observed to turn viscous, following which it is transferred to a vacuum furnace chamber where it is further heated at the above temperature range for 2-24 hours in order to remove the solvent and obtain the resultant solid polymer electrolyte. The produced solid polymer electrolyte comprises the aluminum salt and the cross-linking polymer in the weight ratio that was selected, typically the cross-linking polymer at 9-50 wt % and the aluminum salt at 50-91 wt %).

In another embodiment, the cross-linking polymer may be mixed with aluminum halides (such as AlCl$_3$, AlBr$_3$, AlI$_3$) and 1-ethyl-3-methylimidazolium chloride (EMIMCl, Sigma-Aldrich), 1-ethyl-3-methylimidazolium bromide (EMIMBr, Sigma-Aldrich), or 1-ethyl-3-methylimidazolium iodide (EMIMI, Sigma-Aldrich), where the ratio of the aluminum halide to the 1-ethyl-3-methylimidazolium halide ranges from 1:1 to 5:1 (weight:weight). The combined aluminum halide and 1-ethyl methylimidazolium halide is then mixed with the cross linking polymer such as PVDF-HFP or PMMA in a ratio of 1:1 to 10:1 (weight:weight). Typically, 0.1 to 1 g of the mixture per mL of solvent is combined with a solvent such as solvent can be N-methyl pyrrolidone or DMSO. The mixing and heating steps are similar to the process described above. The resultant solid polymer electrolyte will contain aluminum salt, 1-ethyl methylimidazolium halide and the cross-linking polymer in the weight ratio that was chosen, typically the cross-linking polymer at 9-50 wt % and the aluminum salt at 50-91 wt %.

The mixture dissolved in the solvent is heated between about 50° C. and 200° C. for 2-24 hours under constant stirring. In one example, the mixture was heated at 90° C. continuously for 2 hours under constant stirring. This step initiates the polymerization reaction. At the end of this step, the solution turns viscous indicating successful completion of the polymerization reaction. The mixture is then poured into a flat glass petri dish or other suitable container and transferred to a vacuum furnace where it is heated between 50° C. and 200° C. overnight or for as long as necessary to completely remove the solvent. At the end of this step, a free-standing SPE is obtained that can be released from the glass surface either mechanically (peeling off) or through the application of ethanol. A photograph of a SPE is shown in FIG. 16, which shows the cylindrical, free-standing, translucent solid polymer electrolyte that is about 1 mm thick and about 3 cm in diameter.

Introduction of Hydroxides in SPEs: The addition of hydroxides to the electrolyte. described in Example 3, above, can be achieved by introducing a suitable hydroxide in the mixture in addition to the cross-linking polymer and aluminum salt. In one embodiment, 100 mg lithium hydroxide and 900 mg aluminum nitrate were added to about 5 mL deionized water which resulted in the formation of aluminum hydroxide by the following reaction:

$$3LiOH+Al(NO_3)_3 \rightarrow Al(OH)_3+3LiNO_3 \quad (10).$$

In a separate container, poly(vinylidene fluoride-co-hexafluoropropylene) (PVDF-HFP, Sigma-Aldrich) was dissolved in acetone, at a concentration of 500 mg of the polymer in 5 mL acetone, through bath sonication for up to 6 hours, while the bath itself was maintained at a temperature of 60° C. The volume of acetone was maintained at 5 mL through subsequent addition of the solvent as and when required. Upon dissolution of PVDF-HFP in acetone, 5 mL of the solution was added to 5 mL of the aqueous electrolyte solution comprising the reaction products of lithium hydroxide and aluminum nitrate dispersed in DI water. The addition of the PVDF-HFP solution to the aqueous electrolyte solution initiated a polymerization reaction which resulted in the formation of a free-standing solid polymer electrolyte as shown in the inset of FIG. 17.

In a particular embodiment, a solid polymer electrolyte prepared by the method described in the above paragraph was tested in a 2032 coin cell comprising of a cathode comprising manganese oxide treated by acid-based delithiation followed by lithium hydroxide etching of the cathode, and an anode comprising aluminum foil treated as described in Example 1. No separators or liquid electrolytes were used and the solid polymer electrolyte was sandwiched between the anode and cathode.

FIG. 17 illustrates the voltage profile of a battery having a solid-polymer electrolyte, showing a short duration of discharge at 50 µA/cm², followed by discharging at 20 µA/cm² and charging at a current density of 20 µA/cm², with an inset of a photograph of solid polymer electrolytes, indicated by arrows.

Example 6

Charge and Discharge Cycles

Figure 10:
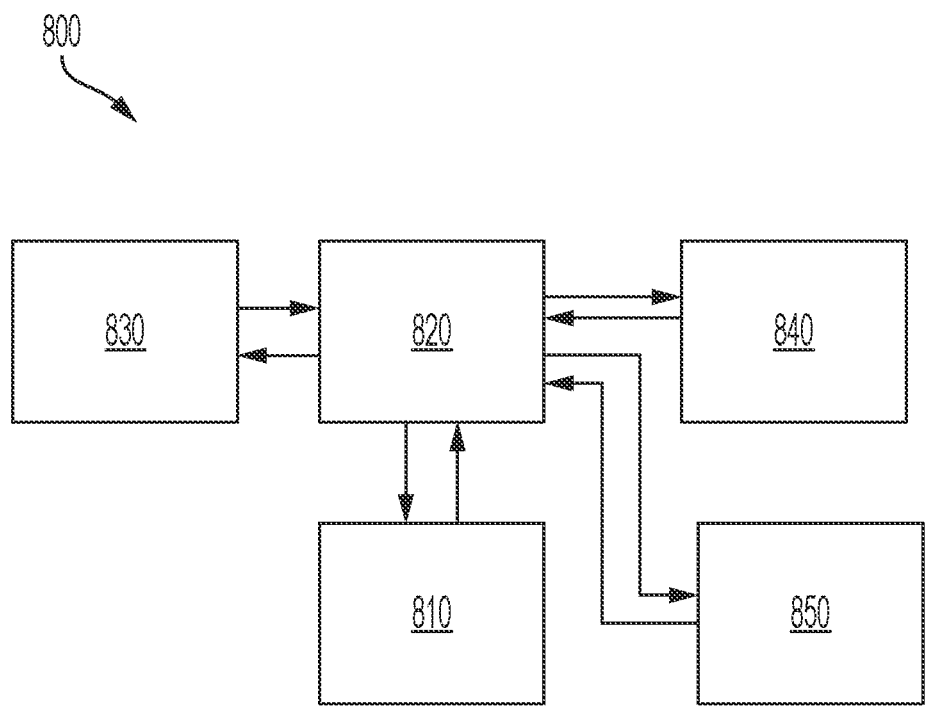
FIG. 10 is a block diagram of a system 800 that incorporates the battery 810 of the present disclosure, showing a controller 820 that is operatively connected to battery 810, a source of electrical power 830, a local electrical load 840 and an electrical power distribution grid 850.

An embodiment of a system useful for changing and discharging the disclosed aluminum ion batteries is illustrated in FIG. 10. In addition to standard galvanostatic (constant current) charge cycles, potentiostatic or a combination of potentiostatic and galvanostatic charge cycles were shown to have an impact on the performance, specifically in terms of faster reaction kinetics (rate capability). The range of voltages for potentiostatic charge was identified to lie between 1.5 V and 2 V, while the optimum value was identified to be about 1.8 V. At voltages greater than 2 V significant electrolysis was observed, confirmed by a rapid rise in currents.

The observed increase in rate capability could be attributed to the presence of a stronger electromotive force to aid in the transport of aluminum-based ions from the cathode back to the anode, which would cause few or no aluminum ions to be lost through side reactions in the electrolyte and thereby a steady electric field is maintained to guide the direction of flow of ions. In addition to galvanostatic, potentiostatic and galvanostatic-potentiostatic charge cycles, a constant voltage sweep rate can be applied to charge the cell in certain embodiments. In certain embodiments, the dV/dt value of the constant voltage sweep rate is from 0.01 mV/second to 100 mV/second. Galvanostatic charge and constant voltage sweep rate charge can both be applied in conjunction with a final constant voltage charge to ensure completion of the charge cycle. Typically, in certain embodiments, the final constant voltage charge is maintained to achieve trickle charge until the current drops below a pre-determined value ranging from 1% to 50% of the current applied during galvanostatic charge cycle.

In certain embodiments, the discharge step can be a combination of high and low current density galvanostatic steps, allowing the cell chemistry to optimize coulombic efficiency and ensure maximum diffusion of active ions and its participation in electron-exchange reactions. Since the discharge process is a function of the rate at which aluminum ions diffuse through manganese oxide, such a combination of high and low current prevents the build-up of localized charge at the cathode-electrolyte interface and optimizes the efficiency of the cell.

While not wishing to be bound by theory, it is believed that as small regions at the cathode-electrolyte interface continue to build up charge at relatively high current densities, the flow of ions gets impeded and the reaction kinetics become slower. Therefore, a method that follows such a high current draw with a short period of low current density discharge enables dissipation of this localized charge build-up, helping the ions diffuse through the surface and into the longitudinal depths of the cathode and as a result, freeing up the surface of the cathode for subsequent ions to diffuse through to the bulk of cathode. It is believed that at higher current densities, aluminum ions do not have sufficient time to diffuse through the bulk of cathode, resulting in a localized charge build-up at the cathode-electrolyte interface. As the high current density is momentarily replaced by a lower current density, aluminum ions begin diffusing through the bulk of the cathode, resulting in a reduction in the localized charge build-up at the cathode-electrolyte interface.

A typical voltage profile produced using such a discharge profile incorporating a combination of low-current and high-current pulses is shown in FIG. 18. FIG. 18 shows a discharge profile produced by a combination of low-current and high-current pulses. The battery was assembled in a 2032 coin cell format and had an anode comprising an aluminum foil treated with LiOH as described in Example 1, a cathode comprising acid-treated lithium manganese oxide, a 0.5 M aluminum nitrate (aq) electrolyte and a 25 µm thick polypropylene separator with an average pore size of 0.067 µm. The current densities were switched between 100 A/g (low-current pulse) and 500 A/g (high-current pulse), where the current is normalized with respect to the mass of the cathode. Similar approaches can be used with a system such as the one illustrated in FIG. 10 to improve the overall performance of the battery.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method of operating a secondary aluminum-ion battery comprising (i) a first electrode comprising a material, (ii) a second electrode, and (iii) an aqueous electrolyte disposed between the first electrode and the second electrode, the method comprising:
   causing transport of a polyatomic ion comprising aluminum through the aqueous electrolyte between the first electrode and the second electrode,
   wherein the transport comprises reversibly inserting the polyatomic ion comprising aluminum into the material of the first electrode during charge and discharge of the battery.

2. The method of claim 1, comprising charging the battery by causing transport of the polyatomic ion comprising aluminum between the first electrode and the second electrode.

3. The method of claim 1, comprising discharging the battery by causing transport of the polyatomic ion comprising aluminum between the first electrode and the second electrode.

4. The method of claim 1, wherein the polyatomic ion comprises one or more hydroxyl groups.

5. The method of claim 1, wherein the polyatomic ion is $Al(OH)_4^{1-}$.

6. The method of claim 1, wherein the aluminum in the polyatomic ion is multivalent.

7. The method of claim 6, wherein the aluminum in the polyatomic ion has valence of 3+.

8. The method of claim 6, wherein the valence of the polyatomic ion during transport is less than the valence of the aluminum in the polyatomic ion.

9. The method of claim 6, wherein the polyatomic ion is monovalent during transport.

10. The method of claim 1, wherein the transport comprises reacting hydroxides in the electrolyte with aluminum in the first electrode or in the second electrode to form $Al(OH)_4^{1-}$.

11. The method of claim 10, wherein the reacting occurs during charge or discharge of the battery.

12. The method of claim 1, wherein the material is a manganese oxide structured to accommodate reversible insertion of the polyatomic ion comprising aluminum into the manganese oxide.

13. The method of claim 12, wherein the transport comprises intercalating the polyatomic ion comprising aluminum into the manganese oxide.

14. The method of claim 12, wherein the transport comprises deintercalating the polyatomic ion comprising aluminum from the manganese oxide.

15. The method of claim 12, wherein the manganese oxide is a lithium manganese oxide and the method further comprises causing transport of an ion comprising lithium through the aqueous electrolyte between the first electrode and the second electrode while the polyatomic ion comprising aluminum is transported between the first electrode and the second electrode.

16. The method of claim 15, wherein the lithium manganese oxide is an acid-treated lithium manganese oxide.

17. The method of claim 12, wherein the manganese oxide is manganese dioxide.

18. The method of claim 1, wherein the transport causes the battery to discharge, wherein a discharge reaction during the discharging is: $Al(OH)_4^{1-} \rightarrow Al(OH)_3 + OH^- + 3e$.

19. The method of claim 1, wherein the transport causes the battery to charge, wherein a charge reaction during the charging is: $Al(OH)_3 + 3e \rightarrow Al^{3+} + 3OH^-$.

20. The method of claim 1, wherein a porous separator physically separates the first electrode from the second electrode, the porous separator has an average pore size of 0.067 µm to 1.2 µm, and the polyatomic ion comprising aluminum transports through the porous separator during the transport.

21. The method of claim 1, wherein the aqueous electrolyte comprises an aluminum salt and a concentration of the aluminum salt in the electrolyte is in a range from 0.05 M to 5 M.

22. The method of claim 21, wherein the aluminum salt is aluminum nitrate.

23. The method of claim 1, wherein the battery is environmentally sealed.

* * * * *